(12) United States Patent
Peleg et al.

(10) Patent No.: US 8,045,484 B2
(45) Date of Patent: Oct. 25, 2011

(54) METHOD FOR PROBLEMATIC USER DETECTION

(76) Inventors: Yaron Menahem Peleg, Tel-Aviv (IL); Gadi Shimon Perets, Shoham (IL)

( * ) Notice: Subject to any disclaimer, the term of this patent is extended or adjusted under 35 U.S.C. 154(b) by 1222 days.

(21) Appl. No.: 11/436,561

(22) Filed: May 19, 2006

(65) Prior Publication Data

US 2006/0262764 A1 Nov. 23, 2006

Related U.S. Application Data

(60) Provisional application No. 60/682,802, filed on May 20, 2005, provisional application No. 60/682,803, filed on May 20, 2005, provisional application No. 60/682,804, filed on May 20, 2005, provisional application No. 60/682,806, filed on May 20, 2005.

(51) Int. Cl.
*H04L 12/28* (2006.01)

(52) U.S. Cl. ........................................ 370/255

(58) Field of Classification Search ............... 370/234, 370/328, 252–255, 338–349; 714/748, 749
See application file for complete search history.

(56) References Cited

U.S. PATENT DOCUMENTS

| | | | |
|---|---|---|---|
| 6,233,449 B1 * | 5/2001 | Glitho et al. | 455/423 |
| 6,438,123 B1 | 8/2002 | Chapman | |
| 6,560,223 B1 | 5/2003 | Egan et al. | |
| 6,594,280 B1 | 7/2003 | Chapman | |
| 6,785,513 B1 | 8/2004 | Sivaprakasam | |
| 6,920,125 B1 | 7/2005 | Wu | |
| 6,931,512 B2 | 8/2005 | Dillon | |
| 6,950,628 B1 | 9/2005 | Meier | |
| 7,002,995 B2 | 2/2006 | Chow | |
| 7,010,002 B2 | 3/2006 | Chow | |
| 7,120,467 B2 * | 10/2006 | Umesh et al. | 455/562.1 |
| 2002/0160806 A1 | 10/2002 | Arazi | |
| 2003/0033394 A1 | 2/2003 | Stine | |
| 2003/0149772 A1 | 8/2003 | Hsu | |
| 2003/0220112 A1 | 11/2003 | Bugeja | |
| 2004/0009749 A1 | 1/2004 | Arazi | |
| 2004/0039817 A1 | 2/2004 | Lee | |
| 2004/0049570 A1 | 3/2004 | Frank | |
| 2004/0051664 A1 | 3/2004 | Frank | |
| 2004/0053624 A1 | 3/2004 | Frank | |
| 2004/0078468 A1 | 4/2004 | Hedin | |
| 2004/0121749 A1 | 6/2004 | Cui | |
| 2004/0165555 A1 | 8/2004 | Backes | |
| 2004/0166871 A1 | 8/2004 | Backes | |
| 2004/0192325 A1 | 9/2004 | Backes | |
| 2004/0203688 A1 | 10/2004 | Backes | |
| 2004/0224637 A1 | 11/2004 | Silva | |
| 2004/0259563 A1 * | 12/2004 | Morton et al. | 455/452.2 |
| 2005/0058125 A1 | 3/2005 | Mutikainen | |
| 2005/0060319 A1 | 3/2005 | Douglas | |
| 2005/0066040 A1 | 3/2005 | Borella | |
| 2005/0073981 A1 | 4/2005 | Banerjee | |
| 2005/0111403 A1 | 5/2005 | Rudolf | |
| 2005/0122999 A1 | 6/2005 | Scherzer | |
| 2005/0157676 A1 * | 7/2005 | Kwak et al. | 370/328 |
| 2005/0163059 A1 * | 7/2005 | Dacosta et al. | 370/252 |
| 2005/0226228 A1 | 10/2005 | Dowling | |
| 2005/0232179 A1 | 10/2005 | daCosta | |

(Continued)

*Primary Examiner* — Derrick Ferris
*Assistant Examiner* — Mang Yeung
(74) *Attorney, Agent, or Firm* — Vladimir Sherman; Professional Patent Solutions

(57) ABSTRACT

A method for problematic station detection featuring problematic station detection algorithm based on calculating the amount of time a station is wasting.

18 Claims, 10 Drawing Sheets

U.S. PATENT DOCUMENTS

| | | |
|---|---|---|
| 2005/0243746 A1 | 11/2005 | Mutikainen |
| 2006/0009232 A1 | 1/2006 | Vakil |
| 2006/0039353 A1 | 2/2006 | Samuel |
| 2006/0056442 A1 | 3/2006 | DaCosta |
| 2007/0222692 A1* | 9/2007 | Skafidas et al. ............... 343/729 |

* cited by examiner

METHOD FOR PROBLEMATIC USER DETECTION

FIELD AND BACKGROUND OF THE INVENTION

The present invention relates to wireless communication networks and, more particularly, to method for problematic station detection featuring problematic station detection algorithm based on calculating the amount of time a station is wasting.

To date, the inventor is unaware of prior art teaching of a method for problematic station detection based on calculating the amount of time a station is wasting.

There is thus a need for, and it would be highly advantageous to have a method for problematic station detection featuring problematic station detection algorithm based on calculating the amount of time a station is wasting.

SUMMARY OF THE INVENTION

The present invention relates to wireless communication networks and, more particularly, to method for problematic station detection featuring problematic station detection algorithm based on calculating the amount of time a station is wasting.

Implementation of the method for problematic station detection of the present invention involves performing or completing selected tasks or steps manually, semi-automatically, fully automatically, and/or, a combination thereof. Moreover, according to actual instrumentation and/or equipment used for implementing a particular preferred embodiment of the disclosed method, several selected steps of the present invention could be performed by hardware, by software on any operating system of any firmware, or a combination thereof. In particular, regarding hardware, selected steps of the invention could be performed by a computerized network, a computer, a computer chip, an electronic circuit, hard-wired circuitry, or a combination thereof, involving a plurality of digital and/or analog, electrical and/or electronic, components, operations, and protocols. Additionally, or alternatively, regarding software, selected steps of the invention could be performed by a data processor, such as a computing platform, executing a plurality of computer program types of software instructions or protocols using any suitable computer operating system.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented for the purpose of providing what is believed to be the most useful and readily understood description of the principles and conceptual aspects of the present invention. In this regard, no attempt is made to show structural details of the present invention in more detail than is necessary for a fundamental understanding of the invention. Moreover, the description taken with the drawings makes apparent to those skilled in the art how the several forms of the invention may be embodied in practice. Identical structures, elements or parts which appear in more than one figure preferably are labeled with a same or similar number in all the figures in which they appear. In the drawings.

DETAILED DESCRIPTION

The present invention relates to wireless communication networks and, more particularly, to method for problematic station detection featuring problematic station detection algorithm based on calculating the amount of time a station is wasting.

The present invention is method for problematic station detection. The preferred embodiments of the present invention are discussed in detail below. It is to be understood that the present invention is not limited in its application to the details of the order or sequence of steps of operation or implementation of the method set forth in the following description, drawings, or examples. While specific steps, configurations and arrangements are discussed, it is to be understood that this is done for illustrative purposes only. A person skilled in the relevant art will recognize that other steps, configurations and arrangements can be used without departing from the spirit and scope of the present invention.

The steps, components, operation, and implementation of methods for problematic station detection, according to the present invention, are better understood with reference to the following description and accompanying drawings.

Herein, the terms "relevant zone of interest" or "zone of interest" or "area of interest" refer to the zone containing all stations, also known as users, and Access Points (APs) that affect the performance of a relevant AP. Without limiting the scope of the present invention, the relevant AP is, in most cases, the AP that the methods of the present invention are applied to. Moreover, the relevant zone of interest includes the stations and APs from which the relevant AP receives transmissions, and stations and APs that influence the performance of the relevant AP.

Hereinafter, the term "jitter" refers to the variation of the delay of packet transmission. The jitter is calculated in relation to the times when stations would like to transmit the packets. For example, when a station wants to transmit packets every 20 mili-seconds, but succeeds in transmitting packets only every 24 mili-seconds, there is a jitter of 4 mili-seconds.

Hereinafter, the term "streaming data" refers to data that is structured and processed in a continuous flow, such as, without limiting the scope of the present invention, digital audio and video, and preferably Voice over Internet Protocol (VoIP) and Video over Internet Protocol.

Figure 1:
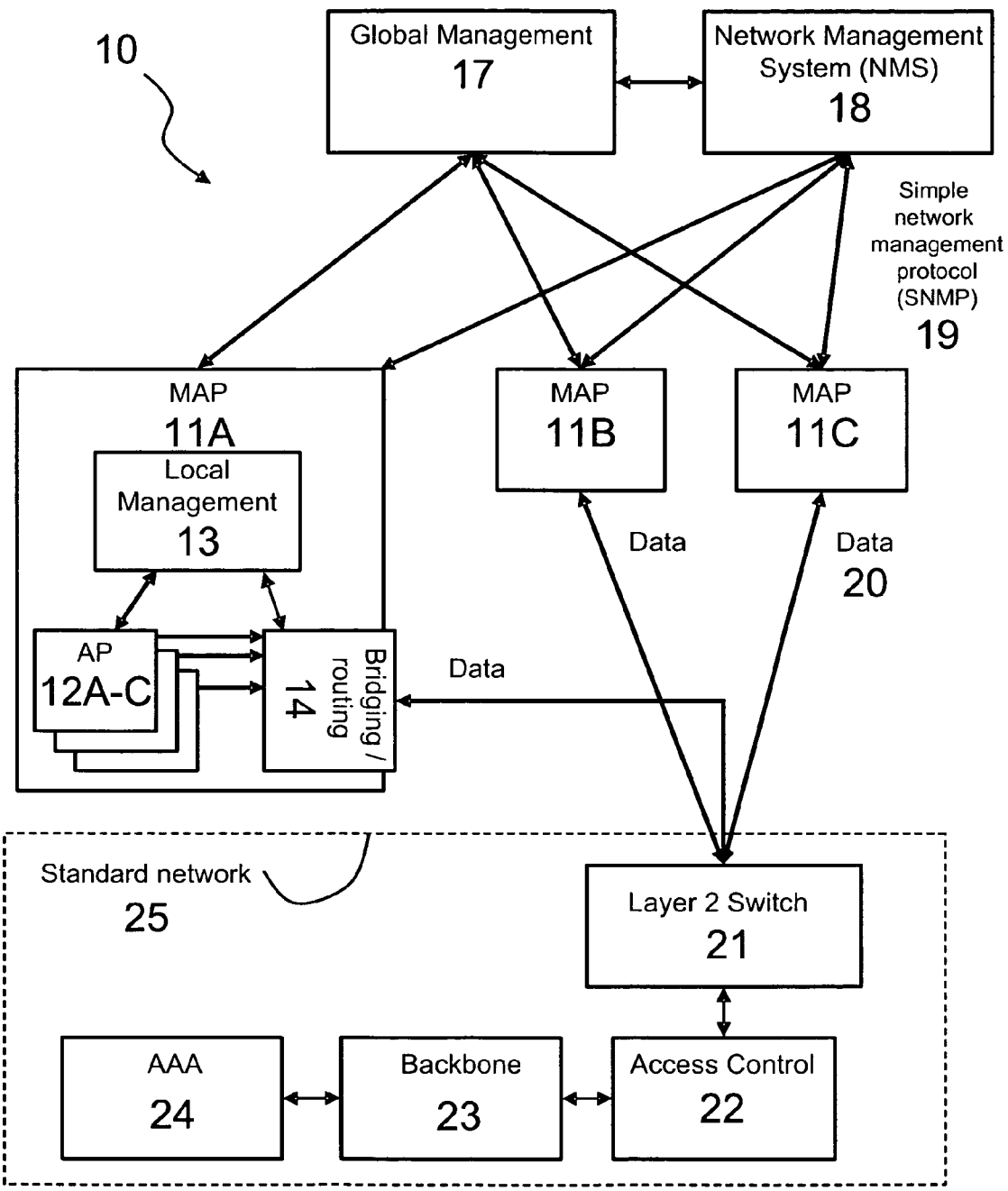
FIG. 1 is an illustration of an exemplary architecture in accordance with the present invention.

Hereinafter, the term "IEEE 802.11 type of protocol" refers to any wireless standard under IEEE 802.11, including but not limited to, 802.11b/g/a/e/i/k/r/v/s/n/u/y/w Referring now to the drawings, FIG. 1 illustrates an optional architecture of a preferred embodiment of the present invention. Referring to FIG. 1, there is at least one Multi-Access Point (MAP). Each MAP (referred to as 11A, 1B, 11C, or 11) represents at least two APs (12A, 12B, and 12C) that are controlled by the same manager; the manager may be located at local management 13 and/or global management 17. Optionally, each MAP may, in addition, feature a bridging 14 device and/or local management 13. For the sake of simplicity, FIG. 1 does not reflect that MAPs 11B and 11C include the same abovementioned devices shown in MAP 11A.

MAP 11 sends and receives data to and from network 25. Network 25 may be a standard network. Optionally, MAP 11 communicates with global management 17 algorithms and Network Management System (NMS) 18. Those communications may be operated by a local/global protocol and a global/local protocol.

FIG. 1 illustrates MAP 11A featuring three APs referred to as 12A, 12B, and 12C. Local management 13 manages at least two Access Points (APs) 12 as disclosed herein. Access Points (APs) 12A-C, may be located close to one another and may operate either simultaneously or independently. Preferably, each AP transmits on a different channel. Optionally, an AP is able to transmit on more than one channel.

Local management 13 is responsible for Load-Balancing (LB) the channels "owned" by MAP 11A, and for local optimization of the Spectrum-Management (SM). Local management 13 uses a set of algorithms, referred to as local management algorithms. Local management algorithms evaluate the state of each channel and the state of each station, and optimize the network in order to provide the required performance.

At least two APs 12 are able to operate simultaneously, and in close proximity, thereby introducing design requirements for channel isolation. This ability of AP/APs to simultaneously operate also introduces operational capabilities of spectrum management and load balancing.

It is to be understood that the location of global management algorithms 17 and Network Management System (NMS) 18 and their way of implementation exemplifies only one embodiment of a device featuring at least two channels, in accordance with the present invention. In actual operations and/or in other equivalent embodiments, global management 17 algorithms and Network Management System (NMS) 18 may have other embodiments. However, it is to be understood that these are only examples of the present invention, and there is no intent of limiting the scope of the present invention to the specifically disclosed global management algorithms, and/or Network Management System (NMS), and/or IEEE 802.11 type of protocol.

Moreover, in an exemplary embodiment of the present invention, the sessions are voice over IP (VoIP) sessions, and/or multimedia over IP sessions. It is to be understood that VoIP is only an example of a streaming application for which the present invention is useful. For the sake of simplicity, the disclosure of the present invention is illustrated using both references and examples mostly related to VoIP applications. However, it is to be understood that these are only examples of the present invention, and there is no intent of limiting the scope of the present invention to VoIP applications and/or to Multimedia over IP applications. Moreover, some of the algorithms of the present invention may be executed on OSI Layer Two (frames), OSI Layer Three (packets), or any other appropriate layer. It is to be understood that any reference to packet or frame is for illustrative purposes only, and a person who has ordinary skill in the area of the technology should be able to convert between the two.

Figure 2:
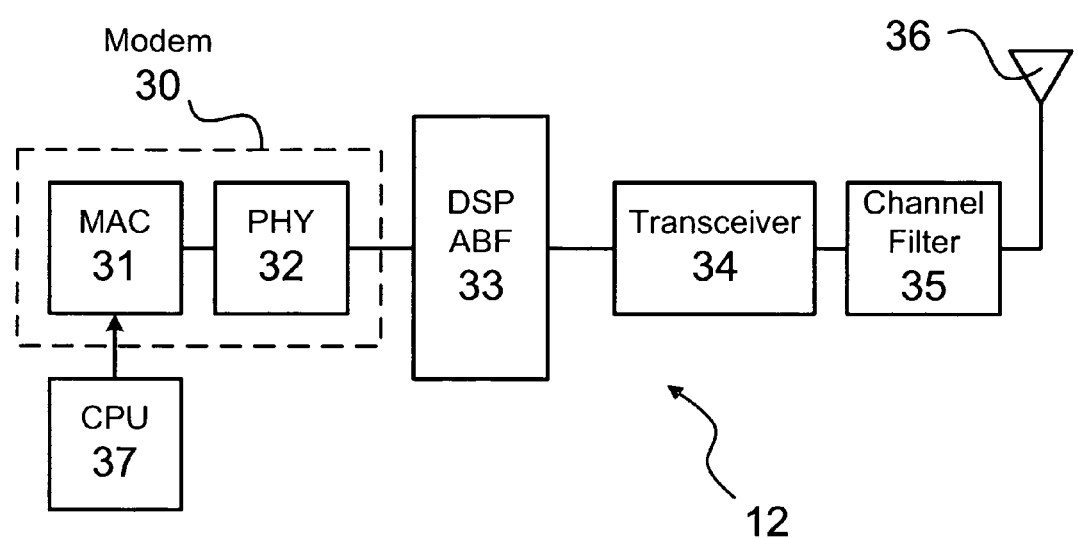
FIG. 2 is an illustration of an exemplary embodiment of an AP in accordance with the present invention.

Steps, components, and operation of preferred embodiments of the methods and corresponding devices of the present invention are further described herein. Referring back to the drawings, FIG. 2 is a block diagram example illustrating an embodiment of AP 12 in accordance with the present invention, constructed and functional for operating at least two channels. Alternatively, each channel may be operated by a different AP. AP 12 features components: (a) smart antenna 36, (b) optional channel filter 35, (c) transceiver 34, (d) optional beamformer 33 operating smart antenna 36, (e) Modem 30, and (f) optional CPU 37.

Modem 30 may be a commercial off-the-shelf modem. Because it may not be possible to modify a commercial off-the-shelf modem, all the proprietary algorithms may be implemented in CPU 37, which is connected to MAC 31. Althernatively, CPU 37 may be connected to other parts of modem 30.

Hereinafter the term "smart antenna" refers to a smart antenna, and/or adaptive antenna, and/or an antenna array featuring at least two radiating elements. In reference to FIG. 2, the smart antenna is antenna 36. Compared to an omni-directional antenna, smart antenna 36 focuses the transmission and receives only from a certain direction, while introducing, amongst others, the following benefits: extended range, high availability of bandwidth per user, and reduced effect of interference. Moreover, by using smart antenna 36, the system of the present invention may implement beam-forming and/or transmit diversity techniques, as known in the art. Alternatively, some parts of the present invention may be implemented without using a smart antenna.

Additional objects, advantages, and novel features of the present invention will become apparent to one of ordinary skill in the art, upon examination of the following possible embodiments, which together with all other descriptions illustrate the present invention in a non-limiting fashion.

In one embodiment of the present invention, each AP controls its own smart antenna and there is no real time connection between the different APs within MAP 11A. Optionally, the connection between the APs is limited to load balancing and spectrum management. According to this optional embodiment, the load balancing algorithms and spectrum management algorithms control and manage the distribution of the wireless resources. Additionally, or alternatively, in another embodiment of the present invention, global management 17 algorithms set local management 13 policies and may allocate stations to APs.

Referring now back to the drawings, FIG. 3 to FIG. 7 illustrate optional configurations of the system of the present invention. It is to be understood that these are only examples of the present invention, and there is no intent of limiting the scope of the present invention to the specifically disclosed configurations.

Figure 3:
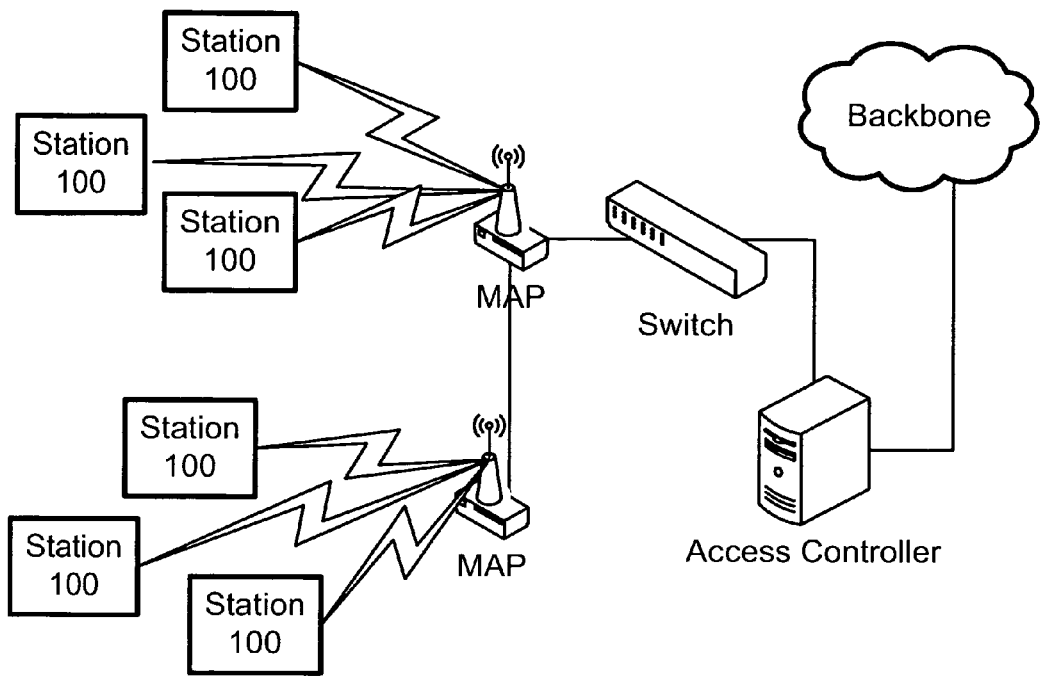
FIG. 3 is an illustration of a wireless network architecture in accordance with the present invention.

FIG. 3 illustrates a system, wherein an access controller, which includes a Network Management System (NMS), might also collect packet information and classify it, as well as features the Service Level Agreement (SLA) and profile of the user.

Figure 4:
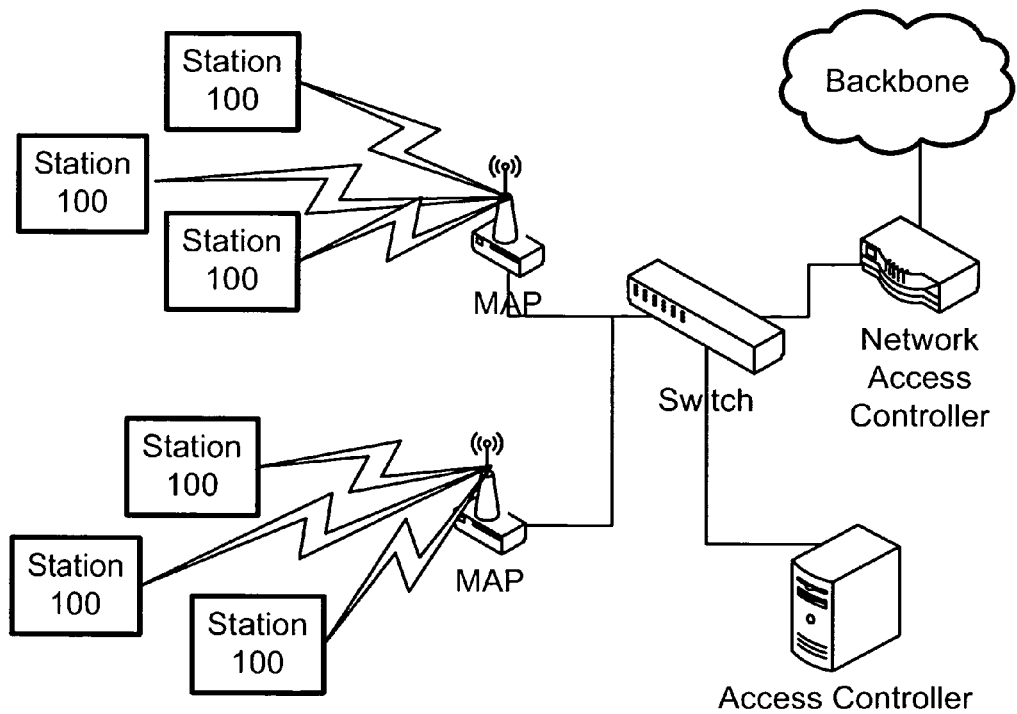
FIG. 4 is an illustration of another wireless network architecture in accordance with the present invention.

FIG. 4 illustrates an embodiment where there is no traffic through the Network Management System and all packet manipulation is performed in the AP.

Figure 5:
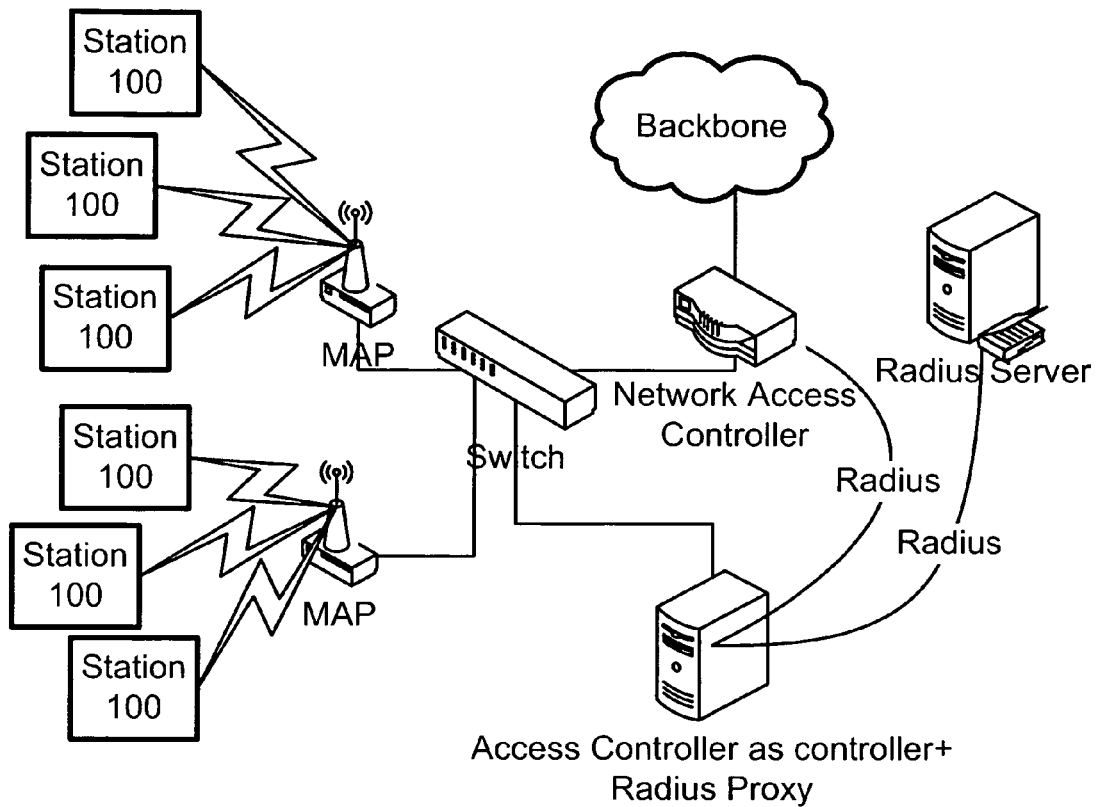
FIG. 5 is an illustration of a wireless network with Radius in accordance with the present invention.

FIG. 5 illustrates an embodiment with Radius, where there is no traffic through the Network Management System but it features the SLA and profile of the user, which might influence the load balancing and spectrum management algorithms.

Figure 6:
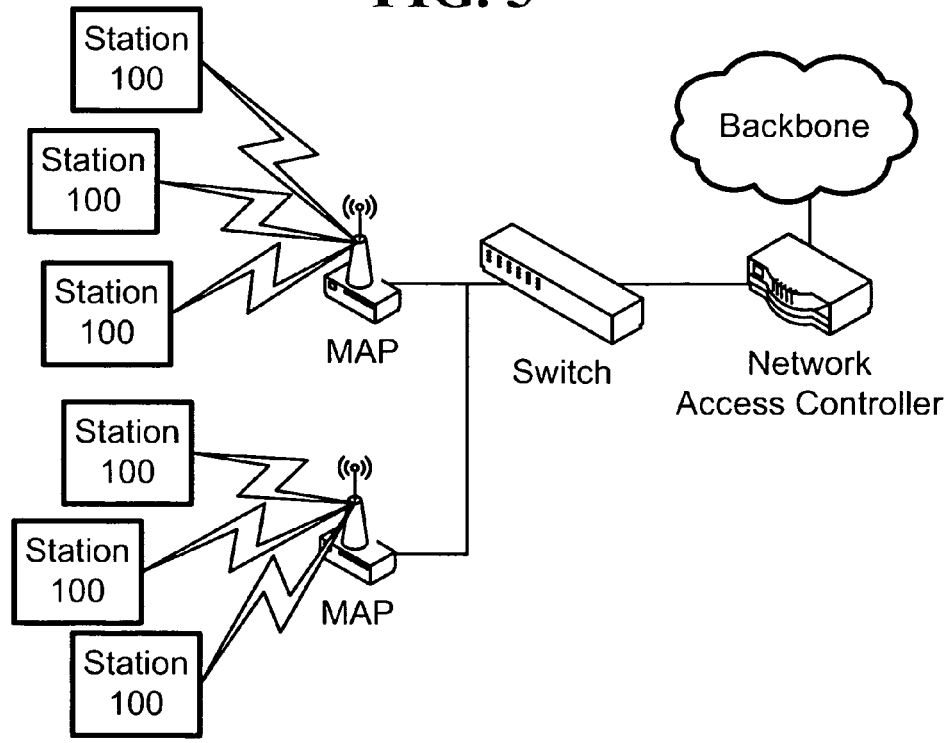
FIG. 6 is an illustration of stand alone APs in accordance with the present invention.

FIG. 6 illustrates a stand alone AP, where there is no Network Management System at all, and all spectrum management and load balancing should be done locally at the AP.

Figure 7:
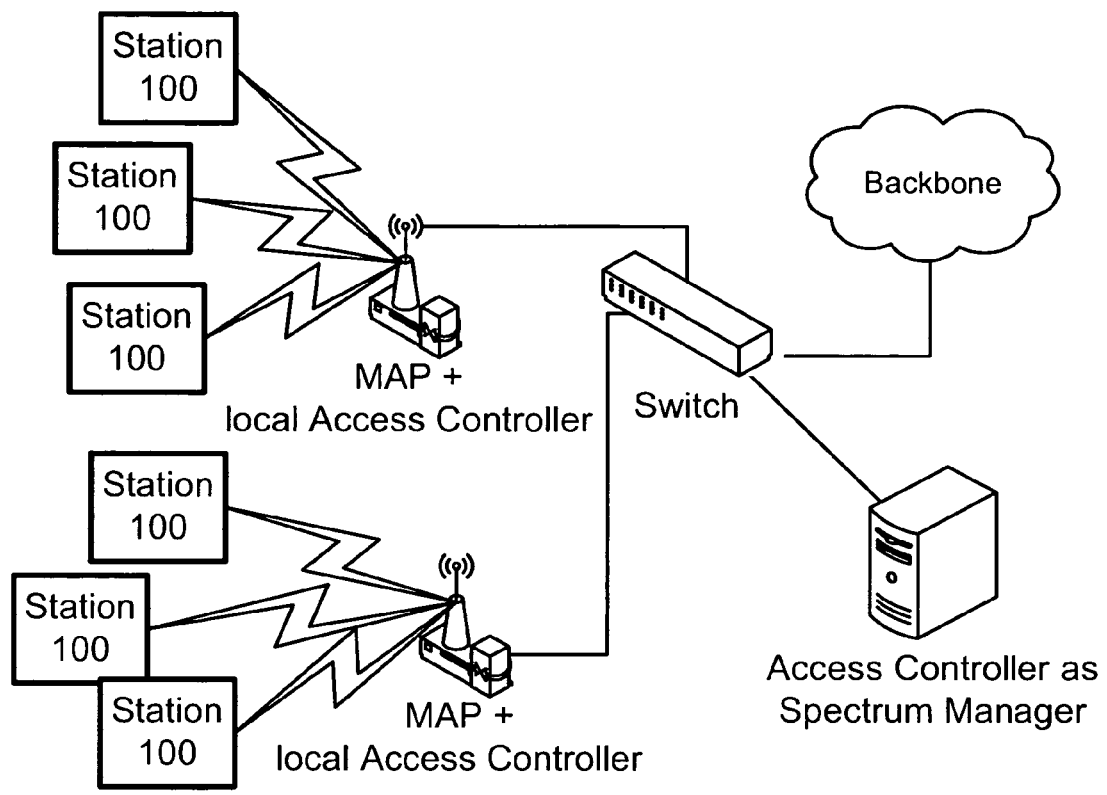
FIG. 7 is an illustration of stand-alone APs with local access controller in accordance with the present invention.

FIG. 7 illustrates a stand-alone access point with local access controller and Network Management System.

Load Balancing

According to an aspect of the present invention, the stations are load balanced between at least two channels. When a station is load balanced, the station is disconnected or moved. When a station is moved, it can be moved either to another channel of the same AP, or to another AP, or to a specific channel of another AP.

Referring now to the LB algorithms, LB algorithms manage at least two simultaneously-operated channels in order to maximize the channels' efficiency. The LB algorithms ensure that the wireless resources are being used in an optimum way so that stations receive the required service. Channel LB is performed by at least one of the following:
  (a) Changing RF parameters.
  (b) Moving stations from one channel to another channel.
  (c) Moving stations from one AP to another AP. For example, moving a station from MAP 11A to MAP 11B.
  (d) Moving a station to another AP on the same channel.
  (e) Not accepting a station if the station does not match a predefined criterion such as being located in a predefined direction.

[Required AP Characteristics]

An AP of the present invention is able to cause stations to move between channels and APs according to a LB decision.

Exemplary methods for moving stations between channels and APs are: (a) Using a standard that has a moving command. (b) Sending a station a disassociation or disauthentication message. (c) Controlling signals power in order to cause a station to change its channel/AP.

Preferably, an AP is able to calculate the Direction of Arrival (DOA) of a received signal, and/or the location of the station from which the signal is received, and/or the distance of the stations from the AP.

DOA, location, and/or distance of the received signal may be calculated by using known in the art methods such as:
  Using a directional antenna.
  Receiving signals from more than one antenna element and calculating the direction of a station using the information from all received signals.
  Using time synchronization measurements from at least two APs.
  Reading the location of a station using a GPS on the station or any other equivalent location mechanism.
  Using RSSI for calculating the distance.

The DOA may change because of the path between the station and the AP, in which case the DOA of the received signal is not the true DOA of the transmitting station. Therefore, it is advantageous to use an appropriate algorithm that uses information from more than one AP and compensates for the multipath error.

Creating an information table that holds information about each station and, optionally, the power with which transmissions from that station are received by other relevant stations and/or APs.

For example, the information table may be a received power table indicating which stations receive what stations, at what power and optionally from which direction.

The LB creates an information table which estimates the location of predefined stations in relation to the location of predefined APs. Alternatively or additionally, the information table indicates which station receives what stations. The information table is created by using the ability of the APs to calculate the DOA and RSSI of received signals and to know from which station the signals were transmitted. Optionally, the received power table is calculated according to the following steps:
  (a) Receiving transmissions from predefined stations in a predefined area.
  (b) Extracting the distance and the direction of the received stations. Optionally, the directions to the received stations are calculated by using one or more of the following optional methods:
    Using a directional antenna,
    Optionally, data about each station is collected from more than one AP and calculating the location of a station is performed by using data from more than one AP. Optionally, data from all APs receiving a station is processed in order to improve the station's location estimation. This is highly useful for overcoming the multi-path effect.
    Optionally, the distance of a station is estimated by the received transmission power.
    Optionally, the system extracts and/or calculates a station's location by receiving information received from the station itself.

According to an alternative option, when communicating with stations operating in two networks, such as dual mode stations or dual band stations or handsets, it is possible to receive information about the location of the dual mode station from the second network. For example, cellular GSM provides location information. Optionally, 802.11k standard may be used to receive measurements for building the information table. Optionally, GPS information received from the station may be used for calculating the relative location of the station.

Optionally, the system is updating the information table.

The information table is updated and its precision is enhanced by checking various parameters and at least one of the following exemplary dynamic effects that may indicate that the information table should be updated.
  A station is moving,
  Transmission blocking/main transmission path changes, for example, because of a moving object, or
  Measurement error.

In an embodiment of the present invention, the LB is based on measuring the number of retransmissions of stations.

Optionally, the LB, and especially the step of allocating stations to groups, takes into account the RSSI and the overall channel utilization. By using these measurements, it is possible to locate the station that causes the problem and to move it to another channel/AP or disconnect it. In this case, reasons for estimation mistakes may be wrong DOA/location estimation and/or wrong estimation of receiving sensitivity or transmit power. In order to further improve the LB, the following are also used:

RSSI and DOA as received on other APs (on the under investigation station) are also used.

Information received from the station itself. Information from the station itself may be collected by implementing standards, such as IEEE 802.11k, that supply such features. Alternatively, proprietary protocols for collecting information from the station itself may be implemented.

Allocating the same channel to closely located stations by using directional information:

In an embodiment of the present invention, AP 12 is able to assign the same channel to closely located stations by using DOA information. Alternatively, AP 12 is able to assign the same channel to closely located stations by using information about the stations' location. Optionally, AP 12 is able to assign the same channel to closely located stations by using DOA information and information about the stations location.

By assigning the same channel to closely located stations, AP 12 assures that all, or most, of those stations receive one another; and thus, the amount of collisions is reduced.

Figure 16:
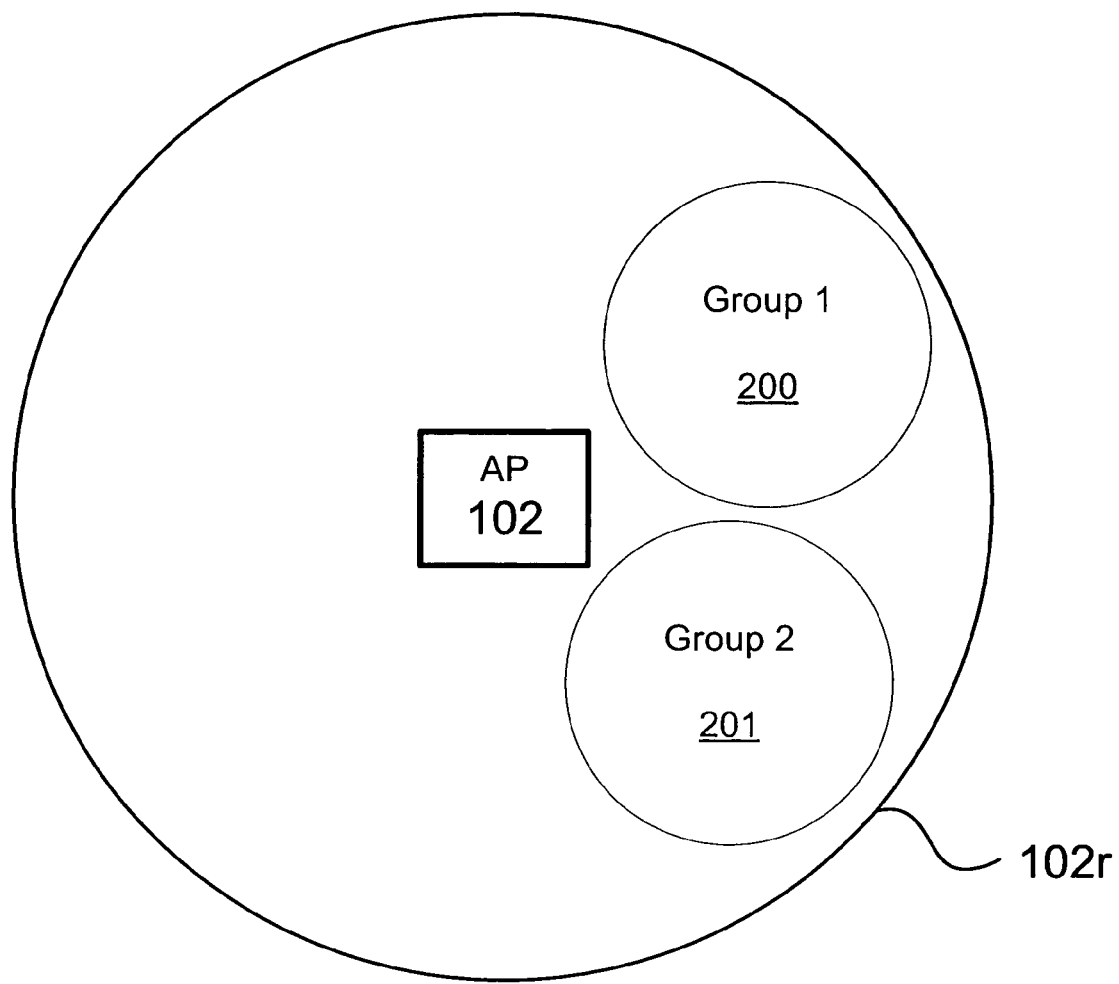
FIG. 16 is still another illustration of load balancing in accordance with the present invention.

Referring to FIG. 16, all stations in Group 1, referred to as 200, use the same channel. Stations in Group 2, referred to as 201, may use the same channel used by Group 1, but preferably, Group 2 stations use another channel or channels.

Figure 14:
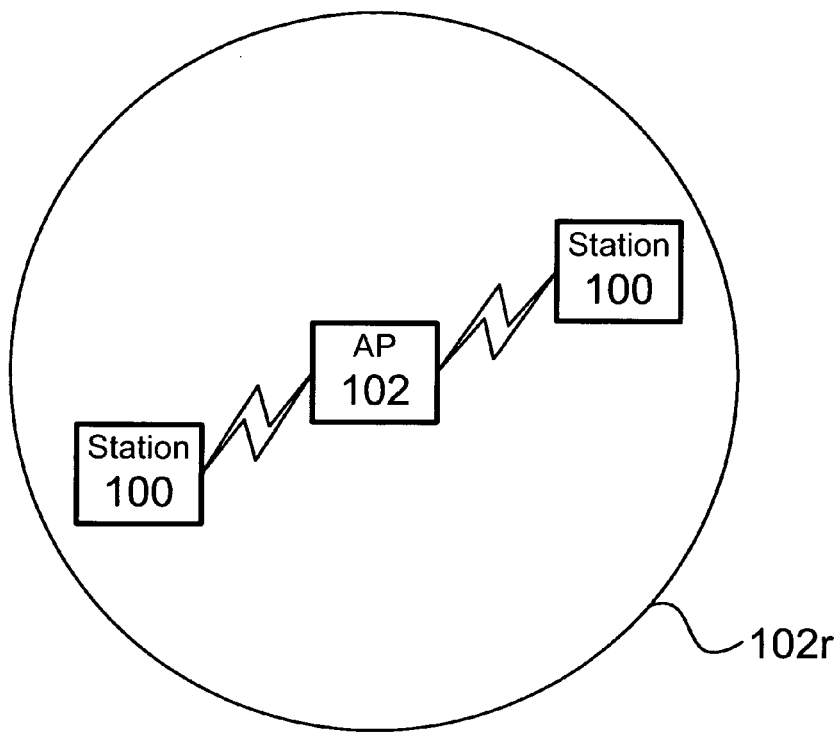
FIG. 14 is an illustration of load balancing in accordance with the present invention.
Figure 15:
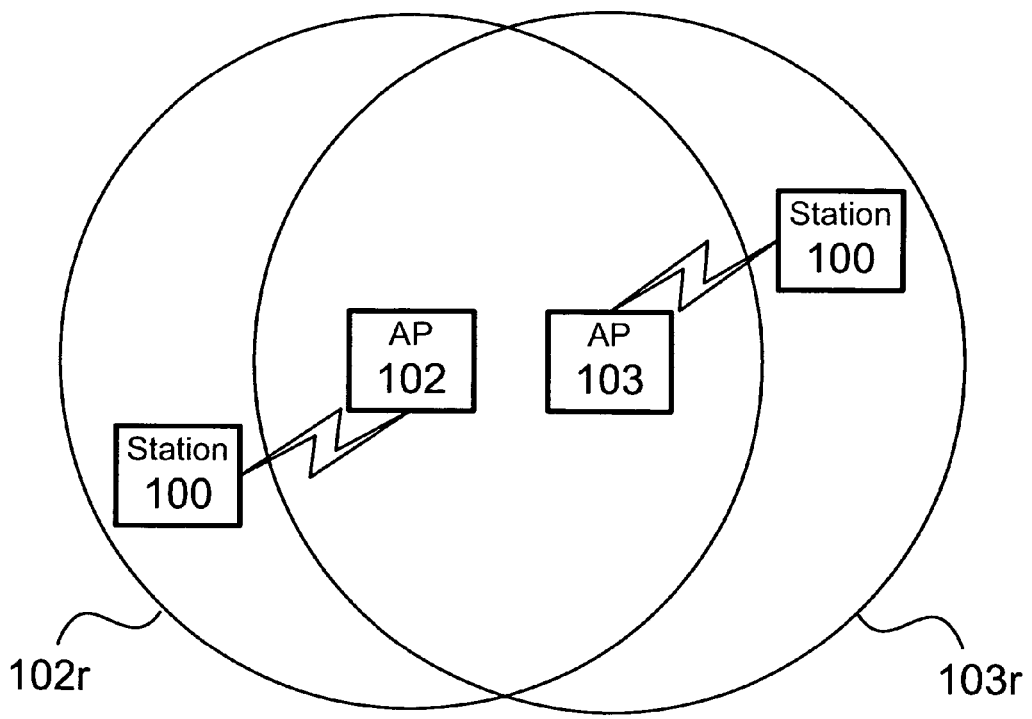
FIG. 15 is another illustration of load balancing in accordance with the present invention.

In order to reduce the number of hidden stations and collisions, and to increase performance, a main object of the present invention is to separate between stations which do not receive each other and are received by one or more APs. Referring to FIG. 14, when two stations that communicate with the same corresponding AP do not receive each other while their corresponding AP receives them both, the two stations should be assigned to different channels of the AP. Referring to FIG. 15, in the case where there are at least two APs and their corresponding stations, wherein the stations do not receive each other but the APs receive the stations—the stations should be assigned to different channels. For example, when two stations are both received by two APs and the stations do not receive each other, the stations should be assigned to different channels.

Using a smart antenna changes the hidden stations phenomena. The managing algorithm that calculates which station receives what station and decides how to move a station, has to take the hidden stations phenomena into account. For example, when there are two hidden stations from opposite sides of an AP, such that station A does not receive station B and therefore both of them transmit in the same channel, then using an AP having a normal omnidirectional antenna results in a collision (classical hidden station). But when using an AP having a smart antenna, the AP may direct its beam to receive the signal from station A and not to receive station B's transmissions, and thus there is no collision.

Improving LB performance by detecting moving stations and moving the station before the system performance degrades.

The ability to estimate a station's location, enables the present invention to estimate whether the station is portable or not, according to the changes, as a function of time, of its reception angle and/or power. Knowing the direction in space in which the station is moving enables the present invention to plan to which AP/channel the station is to be connected, ahead of time. This planning ahead of time enables the system to perform better LB between channels and stations. Moreover, planning ahead of time enables the present invention to have better system performance. A main benefit is that the network is able to move the station to another channel before that station degrades the performance of the network, rather than after a performance degradation is measured. Moreover, this method maintains the system at a higher level of total performance, and increases system stability and QoS.

According to another aspect of the present invention, the performance of a wireless network is improved by using a directional antenna operation as disclosed below.

The present invention solves problems related to the use of directional antennas, which are known to introduce problems, such as hidden stations and deaf stations. On the one hand, using a directional antenna provides the ability to focus on providing higher quality transmissions with fewer disturbances to a specific station. On the other hand, a station outside the beam cannot receive the transmission, and therefore assumes it is allowed to begin a transmission. Moreover, an optional wireless system having a directional antenna does not receive transmissions from a station outside the beam, resulting in transmission failure for the station. In summary, using a directional antenna improves the performance for a specific station, but at the same time, causes problems for the remaining stations located outside the beam. The stations that are located outside the beam expect the AP to transmit omni-directionally, and therefore, if they are not receiving a transmission, the stations assume the AP is not transmitting, and therefore incorrectly assume that they may transmit.

An optional solution to the above hidden and/or deaf station problem for an IEEE 802.11 type of protocol is transmitting a 'Clear To Send' signal, referred to hereinafter as CTS. In an exemplary embodiment of the present invention, a smart antenna is used for directional transmissions. Directional transmissions may be either beamforming or transmit diversity. For the sake of simplicity, the disclosure of the present invention is illustrated using both references and examples mostly related to CTS and RTS-CTS. However, it is to be understood that these are only examples of the protection mechanism of the present invention, and there is no intent of limiting the scope of the present invention to CTS and RTS-CTS. Whenever the AP requests permission to transmit, it transmits a CTS. When a station receives the CTS, it knows it is forbidden from transmitting at this time. The CTS is transmitted using an omnidirectional transmission so that all stations receive the CTS signal, and refrain from transmitting for a predetermined amount of time. This solution is suitable only for the range of omnidirectional transmissions. In the extended range, beyond the range of the omnidirectional transmission, the CTS is transmitted by directional RTS (request to send). Optionally, a directional RTS is used as a protection mechanism.

Prior art uses CTS and RTS for other uses. Originally, CTS was used for combining IEEE 802.11b and IEEE 802.11g stations. RTS and CTS are usually used for large packets. The IEEE 802.11g standard uses the RTS-CTS and the CTS-to-self mechanisms in order to protect the transmissions of an IEEE 802.11g standard from IEEE 802.11b stations that cannot decode the IEEE 802.11g transmissions. Moreover, depending on the location of the stations in a network, another option is to use omnidirectional CTS for commanding the stations not to transmit.

The above-described mechanisms were created in the IEEE 802.11 type of protocol to resolve problems with problematic channels. The standard makes it possible to transmit an RTS signal and/or receive a CTS signal, and only then to send the information. This is instead of sending all data right from the start, without having any indication whether the other side is receiving the transmission or not.

The decision when to transmit omnidirectionally and when to transmit directionally takes into account at least one of the following parameters:

Location of the station.
Received RSSI (Received Signal Strength Indicator).
Rate of transmission.
The implemented standard.

The solution to the hidden and deaf station problem takes into account the advantages of using directional antennas transmissions, versus the disadvantages that result from the need to use preventive steps, such as RTS-CTS, in the hidden and deaf stations. Moreover, the solution may determine the best mixture point that sets how beneficial it is to transmit directionally, and how beneficial it is to transmit omnidirectionally.

An improved optimization may be reached when the location of the stations is known. When the location of the stations is known the algorithm can take into account which station receives what station, and based on that decide when to use directional transmission and when to use omnidirectional transmission.

The transmission angle resulting from using beamforming is wider than the transmission angle resulting from using transmit diversity. Moreover, beamforming is more resistant to changes in the characteristics of the channel and to movements of stations when compared to transmit diversity. On the other hand, transmit diversity features a higher transmission range and an improved rate.

When using beamforming or transmit diversity, there is an extended range that cannot be reached by omnidirectional transmission. In an exemplary embodiment of the present invention, beacons and broadcast are used with beamforming implementation for obtaining an extended range. Therefore, broadcast is transmitted by omnidirectional transmission and extended ranges are covered by directional transmissions.

Optionally, the directional transmissions are scheduled according to a spanning plan or a predefined order having specific and fixed time characteristics.

In an embodiment of the present invention, the following LB method is used to ensure a predefined performance level for selected stations, for example, a minimum amount of Mbit/sec for each station.

The LB is distributing stations between at least two channels according to predefined parameters, such as RSSI and DOA.

The bandwidth of active stations is measured repeatedly.

If an active station does not receive the ensured performance on a specific channel, the station is moved to another channel or to another AP.

The LB selects the station to be moved according to the predefined parameters. By moving the station, the system ensures that the predefined stations receive the predefined performance. As long as the predefined stations do not receive the predefined performance, stations are moved between channels and/or APs in order to obtain a situation wherein the predefined stations receive the predefined performance.

By using the novel LB method of moving active stations between channels and/or APs, it is possible to exploit the channels better and more efficiently.

Spectrum Management

According to another aspect of the present invention, interference is reduced by using the following spectrum-management (SM) method and corresponding device.

Implementing the spectrum-management of the present invention results in at least one of the following significant benefits:

(a) Improving wireless network coverage and performance.

(b) Handling the relationships between different APs. For example, enhancing performance by allocating power, frequency and beam shapes according to locations of APs, locations of stations, path loss, interference, etc.

(c) Canceling interference by forming nulls on disturbing angles. It is to be noted that almost any interference can be canceled by placing nulls. If the interference is WLAN interference—the interference may be resolved by using LB. If the interference is non-WLAN interference—the interference may be resolved by placing a null in the interference direction.

(d) Changing the beam shape in order for the WLAN to meet the requirements of a scenario. This is in contrast to prior art APs that do not feature beamforming and especially do not have feature dynamic beamforming.

Figure 8:
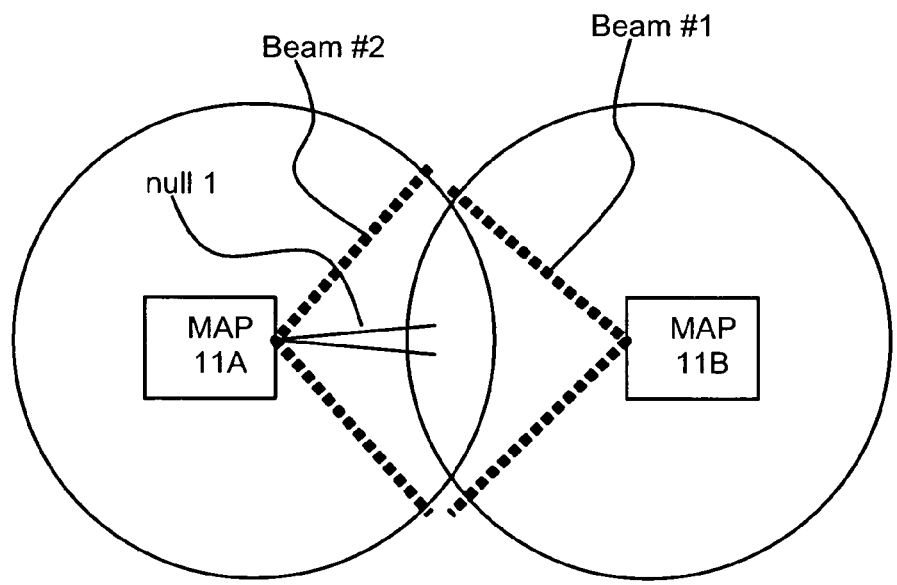
FIG. 8 is an illustration of a generalized IEEE 802.11 type of protocol in accordance with the present invention.

Referring to FIG. 8, which illustrates a generalized IEEE 802.11 type of protocol in accordance with the present invention, each of MAPs 11A, 11B and 11C, represents at least two channels that are controlled by the same manager; the manager may be located at local management 13 and/or global management 17. In the case where a spectrum-management algorithm is run in global management 17, global management 17 builds a map that stores the locations of available stations and APs. Global management 17 uses the locations map and the instantaneous performance of the network to assign the channels, beam shapes, and distribute the stations between the available APs and channels in order to minimize the interference (including internal interference). For example, if a global management 17 algorithm finds that the best performing channel is not assigned to either the fastest stations and/or stations having the highest priority, then global management 17 reassigns that channel to the fastest/highest priority stations.

Optionally, the channels assignment algorithm is re-executed on an ongoing basis, and for all areas and directions.

The wireless network of the present invention may feature different types of APs (single-channel and multi-channel) and a central spectrum-management system receiving relevant information from the APs.

Figure 9:
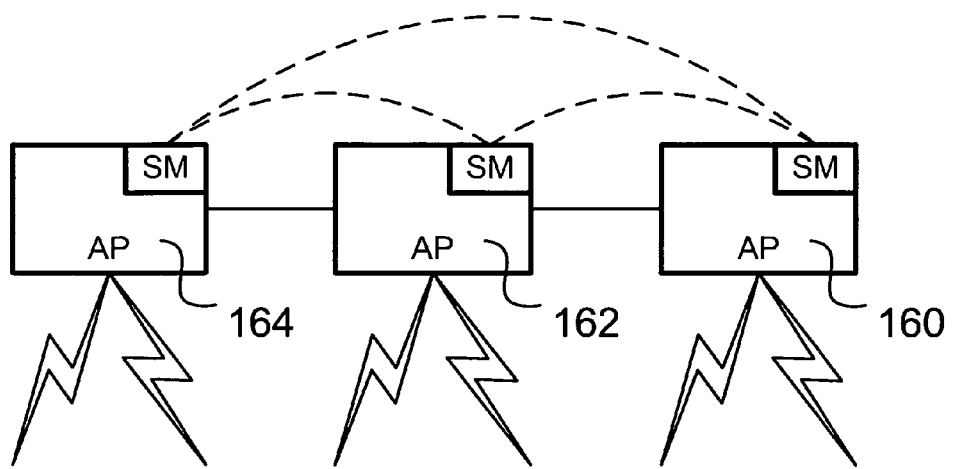
FIG. 9 is an illustration of a spectrum-management algorithm that is running in a distributed manner in accordance with the present invention.

According to an additional exemplary architecture, local management 13 is located in global management 17. That case, the spectrum-management algorithm can be run distributed or centralized. FIG. 9, illustrates a spectrum-management algorithm that is running in a distributed manner. APs 160, 162, and 164, each run a spectrum-management module, where the SMs are connected to one another and each spectrum-management module is responsible for communicating with other spectrum-management modules it interferes with.

In an embodiment of the present invention, the spectrum-management algorithm implements an advanced frequency-assignment planning.

The advanced frequency-assignment planning deals with using specific frequencies in certain areas, to reduce the mutual interference between closely located APs. The advanced frequency-assignment planning can be implemented when at least two APs are operated under the same SM. The advanced frequency-assignment planning is made possible by using a smart antenna, which enables the present invention to transmit within narrow angles. Moreover, in an embodiment of the present invention, each AP has at least two channels and has the ability to place nulls.

Figure 10:
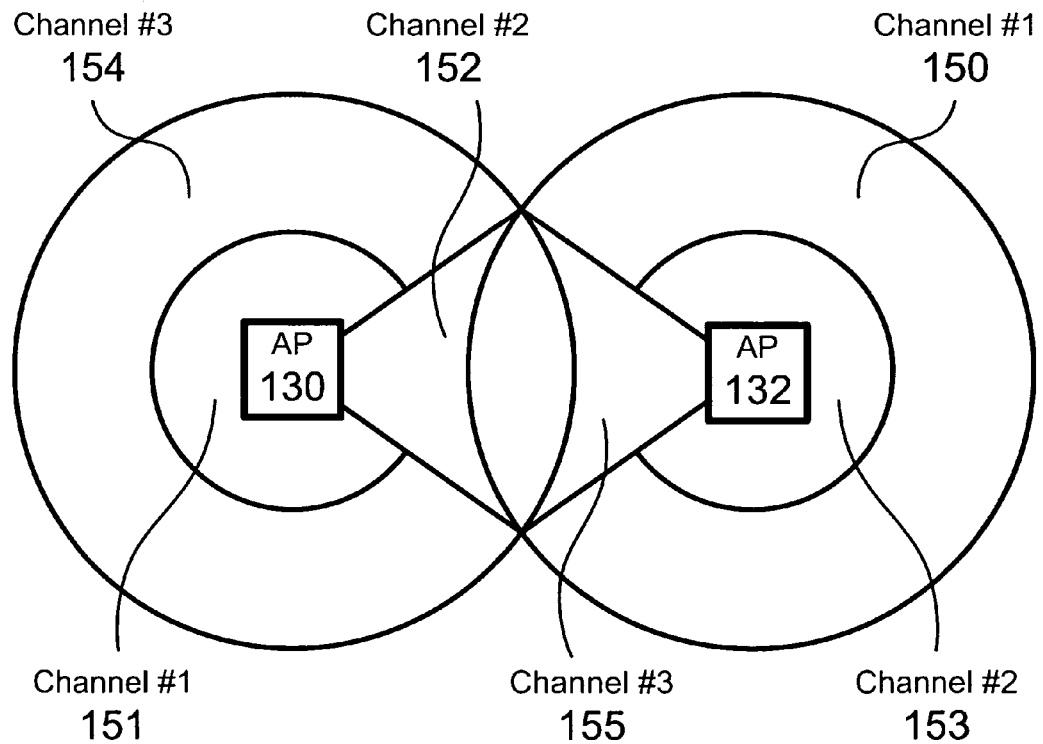
FIG. 10 is an illustration of an exemplary channel allocation plan that in accordance with the present invention.

FIG. 10 illustrates an exemplary channel allocation plan that prevents two or more APs (130 and 132) from covering an overlapping area with the same frequency. As illustrated by FIG. 10, APs (130 and 132) have 3 channels (150-155) each. AP 132 transmits in channel #3 155 towards AP 130, and AP 130 transmits in channel #2 152 towards AP 132.

By using transmit power control, DOA information, and optionally directional transmission, the wireless network can make sure that it accepts users only from the required channel and direction, according to the APs' channel coverage map, as illustrated in FIG. 10. Moreover, the network is able to limit the APs transmissions according to the map, and use LB mechanisms for spectrum-management usage and performance enhancement.

In another embodiment of the present invention, the spectrum-management algorithm implements an advanced interference avoidance planning.

The advanced interference avoidance planning handles interference arriving from a known direction by using a smart antenna, which enables the system to place at least one narrow-angle null in the known interference direction.

Referring to FIG. 8, in order to reduce or prevent interference between different APs and/or to prevent overloading a selected frequency with too many stations, the sectors referred to as Beam #1 and Beam #2 use different frequencies. This directional spectrum-management reduces interference in areas covered by two or more APs. Optionally, null 1 is placed in the estimated direction of a closely located AP. Null 1 may be directed to MAP 11B and/or to areas with a plurality of stations associated to other APs on the same channel.

In an embodiment of the present invention, the spectrum-management algorithm is a dynamic algorithm.

The dynamic spectrum-management algorithm maps both the stations experiencing interference and the direction of the interference. After completing the interference mapping, the channels are dynamically assigned to the stations such that channels experiencing higher interference are assigned to stations featuring lower rates.

The dynamic spectrum-management algorithm accomplishes at least one of the following:
 (a) Improving the spectrum-management algorithm.
 (b) Improving the LB algorithm.
 (c) Improving frequency distribution across channels and directions, and
 (d) Improving the estimation regarding which areas are heavily-loaded with stations.

Optionally, the aforementioned dynamic feature is used for demonstrating to an operator the location of the loaded areas and their deployment. Optionally, the spectrum-management dynamically collects and stores information about the network, which it uses for further improvements.

The ability to control transmission power is known in the art, but the ability to distribute the stations between at least two channels simultaneously, according to the stations' characteristics, is a novel advantage of the present invention. In an embodiment of the present invention, the wireless network transmits using low power to closely located stations and receives with a high receiving threshold. Optionally, the channels that are near the transmitting AP (usually the fastest channel) transmit with the lowest power. At the same time, high-power transmission is used over another channel, to far-away stations.

In an embodiment of the present invention, an IEEE 802.11 type of protocol, which does not support power control, is implemented. In this case, the distance to the station is approximated by measuring power and angle.

In still another embodiment of the present invention, the system creates a transmission pattern featuring a required shape needed for implementing the spectrum-management algorithm. The transmission pattern may constantly have the required shape or have the required shape only when transmitting beacons. Setting the transmission pattern to have the required shape only when transmitting beacons causes the receiving stations to receive the transmitting AP according to the transmission shape. Three optional embodiments for setting the transmission pattern to have a required shape are:
 (a) Transmitting with an antenna featuring the required transmission pattern.
 (b) Dividing the transmission area into sectors and transmitting a specific beacon, featuring the right power, to each sector. Using this beacon customization makes it possible to create the required shape. It is noted that not transmitting the same signal to all directions is a particular case of this embodiment.
 (c) The AP transmits in all directions, but responds only to Probe signals and/or association signals from stations that it wants to add to a specific channel. More specifically, the AP responds to a problem and/or to an association request related to stations featuring direction of arrival and RSSI as required and ignores all other stations.

Spectrum-management may implement dynamic null as follows.

Optionally, the spectrum-management algorithm of the present invention places at least one dynamic null, as disclosed herein. When there is an overlapping area between APs, transmission from stations in that area may be received by the overlapping APs, and these APs may receive the stations' probes. Taking into consideration the fact that stations' probes are sent to Network Management System 18 from more than one AP, together with the probes' DOA, Network Management System 18 is able to calculate the overlapping area of those APs. Optionally, Network Management System 18 bases its overlapping calculations on more than one station's statistics. After extracting the overlapping area of those APs, the Network Management System is able to place dynamic nulls in the direction of those overlapping areas, thus decreasing the interferences between the APs.

It is to be understood that nulls may be used for dealing with general interference and are not solely restricted to overlapping problems.

Spectrum-management may implement a transmit power control as follows.

Transmissions by at least two different APs interfere with one another when each receives the other's transmissions. By means of optimization, which reduces the transmission power in different directions, it is possible to bring the APs into closer proximity with one another, while still restricting their mutual interference to an acceptable level. The ability to control the mutual interference holds great value, especially in places where the number of stations per square meter is large. Whenever there is a large number of stations per square meter, there is a need to bring the APs closer to each other in order to handle all stations. Prior art solutions enable the placement of APs in close proximity by reducing their transmission power. However, reducing the transmission power reduces the QoS/performance provided by the WLAN, and, in some cases, even does not significantly enlarge the number of stations served.

Figure 11:
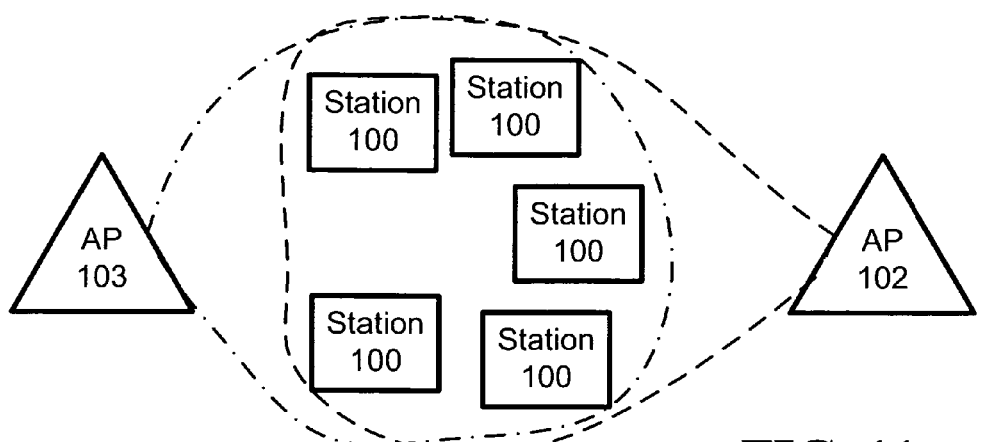
FIG. 11 is an illustration of two APs, that cover the same stations.
Figure 12:
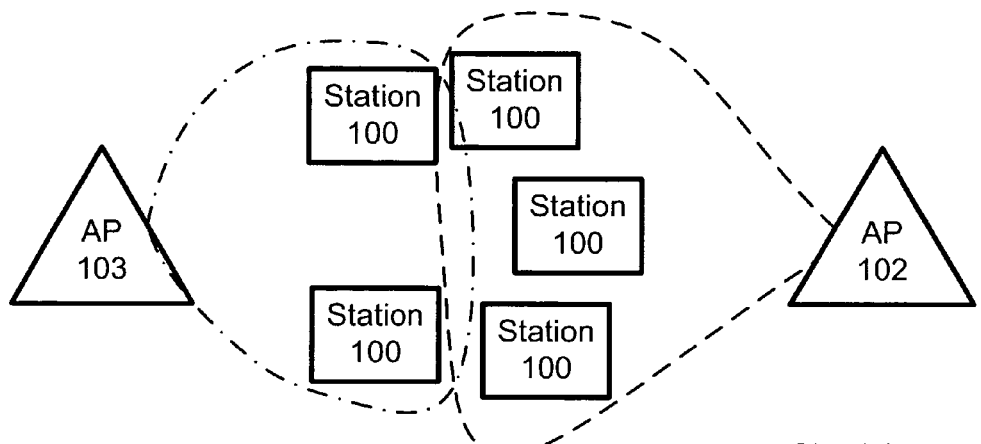
FIG. 12 is an illustration of a transmit power control in accordance with the present invention.
Figure 13:
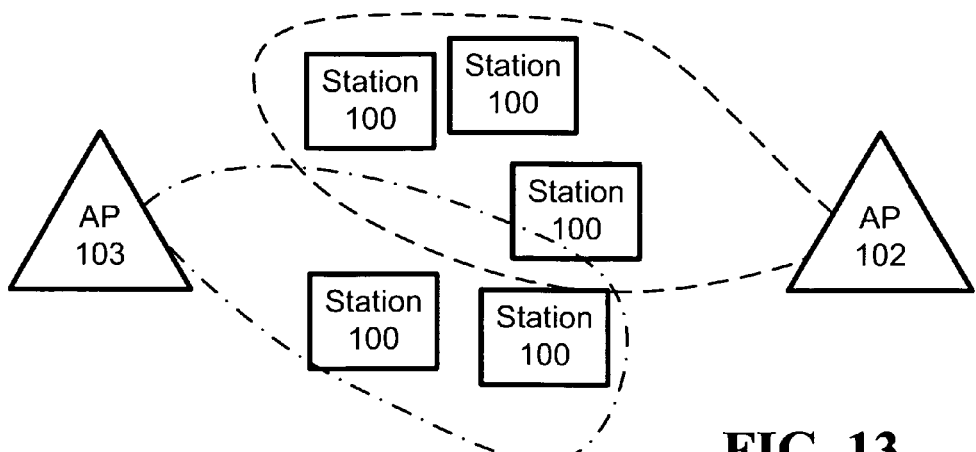
FIG. 13 is an illustration of a directional transmit power control in accordance with the present invention.

By implementing transmit power control, the system of the present invention is able to transmit at a variety of powers to different directions. As a result, a station may receive transmissions from only one AP, even if it is located in an area which, in principle, is covered by at least two different APs. Referring now back to the figures, FIG. 11 illustrates two APs, 102, and 103, that cover the same stations 100. In this case, stations 100 receive transmissions from both APs. FIG. 12 illustrates a transmit power control in accordance with the present invention, wherein each station 100 receives transmission only from AP 102 or AP 103. FIG. 13 illustrates a directional transmit power control in accordance with the present invention, wherein each station 100 receives transmission only from AP 102 or AP 103.

As illustrated in FIG. 12 and FIG. 13, since an AP features a directional antenna having gain, it is possible for the AP to receive another nearby AP, which, due to the transmit power control, does not interfere with the stations and therefore does not transmit. In order to prevent long time-intervals in which an AP is not transmitting because it receives a nearby AP, it is advantageous for the AP to have a receiving threshold as high as possible, that causes the AP to ignore other transmissions with power that is lower than a predefined number of decibels. Ignoring the other transmissions having power that is lower than a predefined number of decibels, enables the AP to transmit.

Increasing the receiving threshold of the AP may contradict some standards, especially the IEEE 802.11 type of protocol, which requires a reasonable threshold of reception. A reasonable threshold of reception is required because it is undesirable for a system to transmit before it tries to sniff the medium, and check if other systems are transmitting at the same time and on the same frequency. In an embodiment of the present invention, the system features a receiving threshold that is lower than the receiving threshold required by the standard. In such a case, the system is able to control its receiving threshold, and to increase the receiving threshold to the maximum allowed by the standard in specific cases.

Maximum Number of Sessions Restriction

According to another aspect of the present invention, the maximum number of session in an IEEE 802.11 type of protocol is limited in order to prevent saturation. The maximum number of sessions restriction mechanism of the present invention maintains QoS of wireless networks by dynamically calculating a maximum number of streaming sessions and ensuring that this maximum number of streaming sessions is not exceeded. Prior art WLAN does not control the number of sessions, so when the maximum number of simultaneous sessions is reached, the QoS for all stations is reduced drastically. The ability to control the number of sessions is a novel advantage of the present invention.

The session restriction mechanism of the present invention may be operated in any known in the art network architecture, such as, but not limited to, the following network architectures.

(a) One AP that communicates with a plurality of stations through one channel. (b) One AP that communicates with a plurality of stations through at least two channels. In this case, the various stations are distributed between the available channels. (c) Communication network controlled by a global SM and/or global LB mechanism. The global SM and/or global LB mechanisms are able to move stations between the available APs. Optionally, the global SM and/or global LB algorithm may be a distributed algorithm executed on the APs or on another hardware platform.

Figure 17:
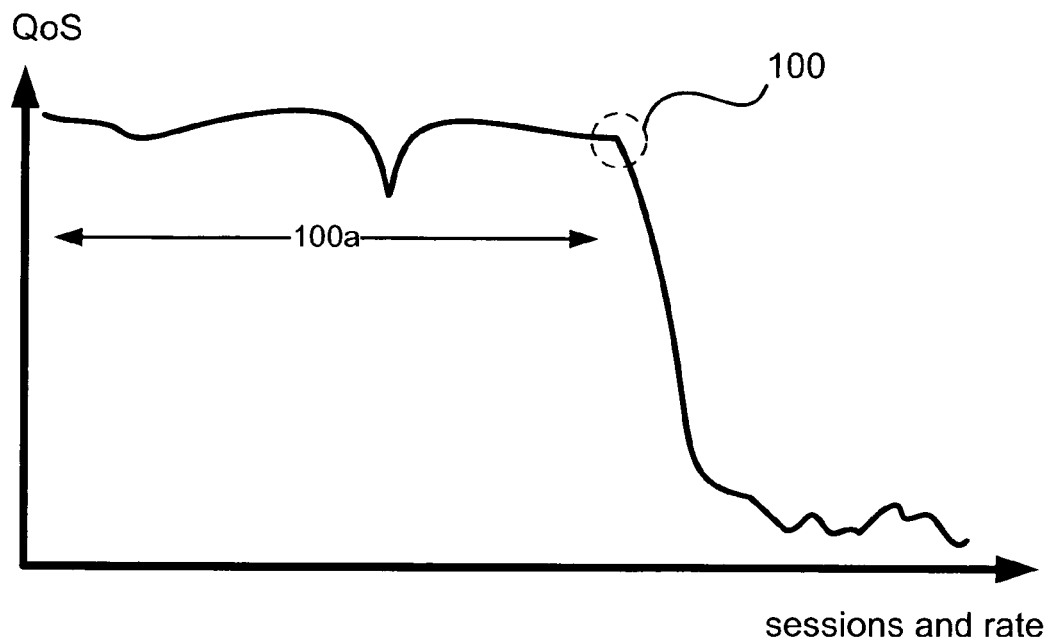
FIG. 17 is an illustration of the QoS as a function of the number of simultaneous sessions in accordance with the present invention.

High QoS is received by all stations in the network until a streaming saturation point is reached, as illustrated in FIG. 17 by reference 100. Whenever the wireless network exceeds streaming saturation point 100, the QoS for all stations is reduced drastically.

It is to be understood that the location of streaming saturation point 100 depends on the stations communicating with the current AP and also on the interference by other stations. The other stations may communicate with a nearby AP or any other type of device transmitting on the relevant frequencies. Therefore, the graph illustrated in FIG. 17 is derived from the overall system performance.

The network may reach point 100 when at least one of the conditions described below occur. The novel session restriction algorithm of the present invention may be operated on the downlink channel and/or on the uplink channel. The reasons for reaching saturation point 100 on the uplink and downlink channels are usually similar. Moreover, the parameters used for the calculation are usually similar. The scenarios for reaching saturation point 100 are usually different on the uplink and downlink channels, and influence the measuring of parameters and the solution. Usually there is no direct connection between the uplink and downlink but in the case of WLAN using the same frequencies for uplink and downlink channels, there is some correlation between the channels and the channels may be likely to fall one after the other. Therefore, identifying a fall in one direction of a channel may be useful for identifying a fall in the other direction of the channel as well.

The following examples illustrate events that may bring the wireless network to its saturation point 100.

A new station joins the network.

The environmental conditions change and/or external interference is added. The external interference may be wireless LAN (WLAN) interference or non-WLAN interference.

The following examples disclose parameters that are useful for calculating and measuring saturation point 100. At least some of the following parameters, optionally with additional data, are used by the novel maximum number of sessions restriction mechanism of the present invention.

The number of simultaneous streaming sessions in the network. Moreover, for each session, the system may monitor the type of the session and other relevant session properties, e.g., vocoder type, frame duration, and voice activity detection (VAD). As known in the relevant art, vocoder, also referred to as voice coder, is an electronic device/algorithm for synthesizing speech. A vocoder usually compresses the voice and therefore changes the packet size. The vocoder may control the packets transmission time, and thereby may transmit bigger packets in a lower frequency.

The transmission rates and number of retransmissions of the stations having streaming sessions.

The external interference of stations located in the area of interest of the network and other interference sources.

external non-WLAN interference.

Total performance of the wireless network.

The distribution/physical-location of the stations within the area of interest. It is to be noted that there are cases wherein a small change in stations distribution is enough to cause performance degradation, or even a transmission path block.

Interference within data traffic that is transmitted at the same time from different stations or from the same AP or from different channels in the same AP.

Rate control algorithm may influence saturation point 100. and

When using standard stations, the system of the present invention can only control the AP operation. Therefore, for downlink, it is possible to influence the rate control and various decisions regarding what information to transmit, if any.

General Description of the Solution:

The method and corresponding system of the present invention has a high ability to collect data from several OSI layers simultaneously. The ability to collect data from several OSI layers simultaneously facilitates decision-making regarding load balancing and number of sessions limitation.

In a preferred embodiment, the system counts the number of streaming data stations, and is able to determine when the network is close to reaching its maximum capacity. Exceeding the system's maximum capacity causes severe degradation in the QoS. By using the method for maximum capacity calculation, optionally based on the disclosed parameters, the system is able to determine which stations are to be disconnected or moved, according to the station's profile and/or station's performance. Moreover, in cases where the system exceeds maximum capacity, it is possible to decide which station to keep and which station to move, disconnect or move to another channel, according to the station's properties. Examples of optional station profiles are VIP station, a frequent station, a visitor station, etc.

Referring again to FIG. 17, area 100*a* between the origin and saturation point 100 may feature the following effects.

(a) Instantaneous degradation of QoS to one or more stations. Depending on the characteristics of the instantaneous QoS degradation, the system my react or not take any action.

(b) Streaming data QoS degradation to some of the stations.

(c) At the end of area 100*a* and before saturation point 100, there may be a slight QoS degradation.

Optionally, WLAN QoS mechanisms are used in determining preference of VoIP sessions, or other streaming sessions, over data transmissions on the same channel. The following three examples disclose possible methods for determining the performance of the streaming sessions.

(a) Using WLAN QoS, such as 802.11e for QoS differentiation between sessions, and QoS priority assignment between VoIP and other application and session types such as data session.

(b) Using WLAN QoS for separating between stations by assigning different priority to different stations. This option is similar to the method of differentiating between stations of different channels.

(c) In an optional embodiment, in order to supply a favorable service to VoIP sessions, synchronous QoS mechanisms, such as IEEE 802.11e-HCCA (polling), are used. The use of synchronous QoS mechanisms enables the system to systemically determine the working point in such a way that each AP and/or area in the relevant zone of interest does not exceed the point represented by streaming saturation point 100. For example, by using the methods disclosed in the present invention the capacity of each AP may be limited in order to enable other nearby AP or APs to work well as well. Alternatively, there are at least two closely situated APs. Whenever at least two closely situated APs are operated without the polling mechanism, each AP receives transmissions from the other APs and takes them into consideration before starting to transmit, resulting in normal network operation. Operating the polling from a system perspective is used in order to prevent each AP from attempting to fill the channel completely, for example, with data transmissions that can be delayed. Operating the polling from a system point of view results in allocating to each AP the greatest amount of resources that can be allocated without reaching streaming saturation point 100. Therefore, polling is a great solution for a single AP, but when operating high throughput networks there is a need to synchronize all of the APs and limit the performances of some/all of the APs in order to prevent cases where different APs interfere with one another, and as a result, network performance is reduced.

Steps, components, operation, and implementation of the method and corresponding device for maximum number of sessions restriction, according to the present invention, are better understood with reference to the following description and accompanying drawings.

QoS is maintained by an algorithm which calculates a dynamic maximum number of sessions and ensures that this dynamic maximum number of sessions is not exceeded. The algorithm features the following steps:

Measuring network parameters. Network parameters may be measured per-station and/or per-channel.

Examples of parameters measured per-station are: type of traffic (such as data, VoIP, streaming video, and simultaneous multi-type station), rate, number of retransmissions, type of station (802.11b/g/n or 802.11a), packet loss, jitter, and delay.

Examples of parameters measured per-channel are: total occupied air capacity (from all sources) and WLAN air capacity, i.e. uplink, downlink, and total WLAN in the specific channel; the number of streaming sessions; the rate of each session; throughput of each session; and amount of packet loss.

The network parameters are measured on an on going basis, optionally in order to calculate when it is possible or impossible to receive an additional station into the network. The monitored parameters are compared to the appropriate thresholds. In cases where it is possible to receive an additional station into the network—the station is handled according to methods known in the art. In cases where it is not possible to receive an additional station into the network—the maximum number of sessions restriction method of the present invention is applied. Generally stated, from a systems perspective, it is always preferable to disconnect the most problematic station.

Calculating streaming performance quality. Preferably, Performance quality is calculated per station, average per channel, and/or as a channel saturation indicator.

An optional streaming quality measurement for per-station calculation in a VoIP application is the known in the art "R-value". R-value measures the streaming session for packet loss, delay, jitter, and type of vocoder. The output of the R-value is a quality measurement of the streaming session.

The streaming performance quality may be Average per channel. This is a calculated average for each channel. For example, averaging the calculated R value of all stations and comparing it to a threshold The following are optional alternative streaming quality measurements for calculating when a streaming channel is saturated.

Calculating the average streaming quality of all stations and checking if it is below a threshold. It is to be noted that checking if something is below or above a threshold are equivalent tests.

Calculating the percentage of stations whose streaming quality is below a predefined threshold. This calculation focuses on specific stations rather than the channel average.

Detecting saturation for a minimum predefined period of time. In this case, if a quality problem is fixed within a predefined time limit—nothing is done. Optionally, if the problem is because a new station was added to the network—the predefined time threshold may be shorter in order to prevent the network from becoming saturated.

Estimating channel saturation according to channel measurements. This channel calculation may be calculated in addition to or instead of the previous station-based calculations. A main benefit of this channel-based calculation is that the channel avoids being saturated by restricting the number of stations it accepts. This is in contrast with the station-based calculation wherein the channel accepts new stations and then makes corrections such as disconnecting or moving stations.

It was found that there are cases where the jitter increases as the network approaches saturation point 100. In an exemplary embodiment of the present invention, monitoring the jitter indicates when the network is expected to reach saturation point 100. In this exemplary embodiment, the method of the present invention detects network overload based on the amount of time a station waits before starting to transmit.

Estimating the channel capacity.

In the step of estimating the channel capacity, a value is calculated, based on the available data, for estimating how many streaming sessions can be added to the channel. Examples of available data are network measurements and the above described per-station and average measurements.

In the case where the system operates a LB algorithm too, a station may be forwarded to other channel. Therefore, the estimated channel capacity is calculated for all relevant channels and not only for the current channel (in order to know if it is possible to forward the station to another channel).

In the case where the estimated channel capacity indicates that no more sessions may be added to the channel, and it is not possible to move sessions to another channel, the network does not accept any more sessions. Alternatively phrasing, estimating the channel capacity is equivalent to calculating the value of saturation point 100. The main parameters affecting saturation point 100 are explained above.

Referring to FIG. 17, the QoS, as a function of the number of simultaneous sessions, is calculated dynamically, and/or measured by parameters such as jitter, packet loss and delay measurements. Streaming saturation point 100 represents the maximum capacity of the network as a function of the required sessions mixture and type of applications. It is to be understood that the algorithms of the present invention take into account at least one of the aforementioned parameters affecting the location of saturation point 100. When the network is saturated, the value of all aforementioned parameters is reduced. Therefore, in an exemplary embodiment of the present invention, thresholds are placed over all parameters affecting the location of saturation point 100. When one parameter exceeds the threshold, the maximum number of sessions restriction algorithm is applied. Known in the art methods may be used offline for calculating and/or calibrating the threshold of each parameter. Optionally, the thresholds are changed online. Thresholds that change online are especially useful for systems that are calibrated in the field. The calibration methods are known in the art of computer networks and data communication.

Preferably, the current dynamic maximum possible number of sessions calculation is performed periodically or immediately after load balancing and/or a disconnecting action and/or termination of an existing session has been performed. It is to be understood that the dynamic maximum possible number of sessions threshold is a dynamic threshold that depends on the state of the network. The calculations in this step and the successive steps are repeated to prevent degradation of the system's performance. In an embodiment of the present invention, the maximum number of sessions restriction mechanism is run in the APs or in the access controller.

Managing the network's sessions. As detailed below, the sessions manager may (a) Limit the number of simultaneous sessions in the system in order to prevent a decrease in the QoS. (b) Limit stations' data throughput. (c) LB stations.

It is to be understood that most descriptions and examples of the present invention relate to controlling the number of simultaneous sessions, but there is no intent to limit the scope of the present invention to number of sessions restriction. For example, the present invention may, alternatively or additionally, control the number of stations connected to the network simultaneously and/or control the throughput of the stations.

Optionally, the sessions manager load balances the network. LB may be global (between APs) or local (between channels of the same AP). The following are three optional preferred load balancing activities.

The first optional load balancing activity is moving (also known as roaming/handovering) and/or disconnecting new or existing stations whenever the number of simultaneous sessions exceeds a threshold.

The second optional load balancing activity is identifying a network saturation when a new session is initialized and performing one of the following steps.

Disconnecting the session of the new station.

LB the new station to another channel or another AP.

LB another station or stations to another channel or another AP.

The third optional load balancing activity is identifying saturation due to a change in a channel. Possible reasons for a change in a channel are:

The environmental conditions change and/or external interference was added. The interference may be wireless LAN interference or non-WLAN interference.

External interference of stations located in the area of interest of the network and/or other interference sources.

The distribution/physical-location of the stations within the area of interest changes. It is to be noted that in some cases, one station's movement is enough for blocking the transmission path.

Optional solutions for identifying saturation because of a change in a channel are:

Disconnecting the session of a specific station according to the algorithm result. If the performance of a specific station was degraded—optionally move the station.

LB a station to another channel or AP.

Disconnect the station.

The following examples are cases where using LB results in a significant performance improvement.

Separation between different types of stations, for example, separating between 802.11g stations and 802.11b/g stations.

Separation between streaming and data stations. There are cases where stations transmit both streaming and data, in that case the station may reduce its data traffic rate.

Separating nearby and far away stations. Nearby stations usually have better performance than far stations that usually reduce the total performance of the channel. Separating nearby and far away stations is also useful for dealing with the "capture effect" in which a nearby station overrides a far away station.

Eliminating the hidden station problem by separating groups of stations that receive each other. Optionally, eliminating the hidden station problem is based on DOA.

Alternatively, the sessions manager disconnects stations.

Whenever the number of simultaneous sessions exceeds a maximum number of simultaneous sessions, new stations and/or existing stations are disconnected. As known in the art, the most common optional station disconnection actions are: signaling disconnection, streaming disconnection, wireless disassociation/disconnecting, and not accepting new sessions.

As disclosed above, the maximum number of sessions restriction mechanism of the present invention may, in some cases, disconnect a session. Herein disclosed are four optional methods for disconnecting a session in an IEEE 802.11 type of protocol: (a) Returning, at the state of initiating the session, a negative signaling response. Optionally, the negative signaling response delivers a "network busy" message. (b) Ending the session by not passing the signaling packets and/or the voice packets. (c) Disassociation of the station.

The following examples illustrate how highly useful it is to disconnect or, alternatively, not accept stations.

Accepting only a predefined type of stations, for example, accepting 802.11g stations and not accepting 802.11b stations.

Accepting only streaming stations and rejecting data stations. In the case where a streaming station connects to the network while a data station is transmitting, the session manager may disconnect the data station in order to provide service to the streaming station.

Accepting nearby stations and rejecting far away stations.

Eliminating the hidden station problem by only accepting stations that receive the other stations. This can optionally be based on DOA.

Alternatively, the sessions manager disconnects stations having quality below a threshold and/or interfering and causing performance degradation to other stations. In this case, the network is not saturated but there is at least one station that is below the threshold—and this station is disconnected.

Optionally, if the AP operates only one channel, it may be possible to LB the station to another AP or disconnect it.

Alternatively, if the AP operates more than one channel, it may be possible to LB the station to another AP, or to another channel, or to disconnect it.

Optionally, connecting the system of the present invention to a streaming data information system.

To verify whether there is enough bandwidth to receive a new station into the network, a protocol for connecting the network of the present invention to a streaming data information system can be added to the present invention. The protocol for connecting the network of the present invention to a streaming data information system may supply the following responses: (a) Enough bandwidth is available and the station can be connected to the network. (b) Not enough bandwidth is available and the station cannot be connected to the network. (c) The station should be forwarded to another channel; On the other channel, the station may be connected to the network.

Optionally, reducing the bandwidth of stations transmitting data when there are stations who need the bandwidth for streaming sessions.

In the case, when a first AP handles a streaming session that is disturbed by transmissions of a data station and/or low priority station, the transmission power of the data station may be reduced in order to reduce the interference with the streaming session operated by the first AP.

Problematic Station Detection

Figure 18:
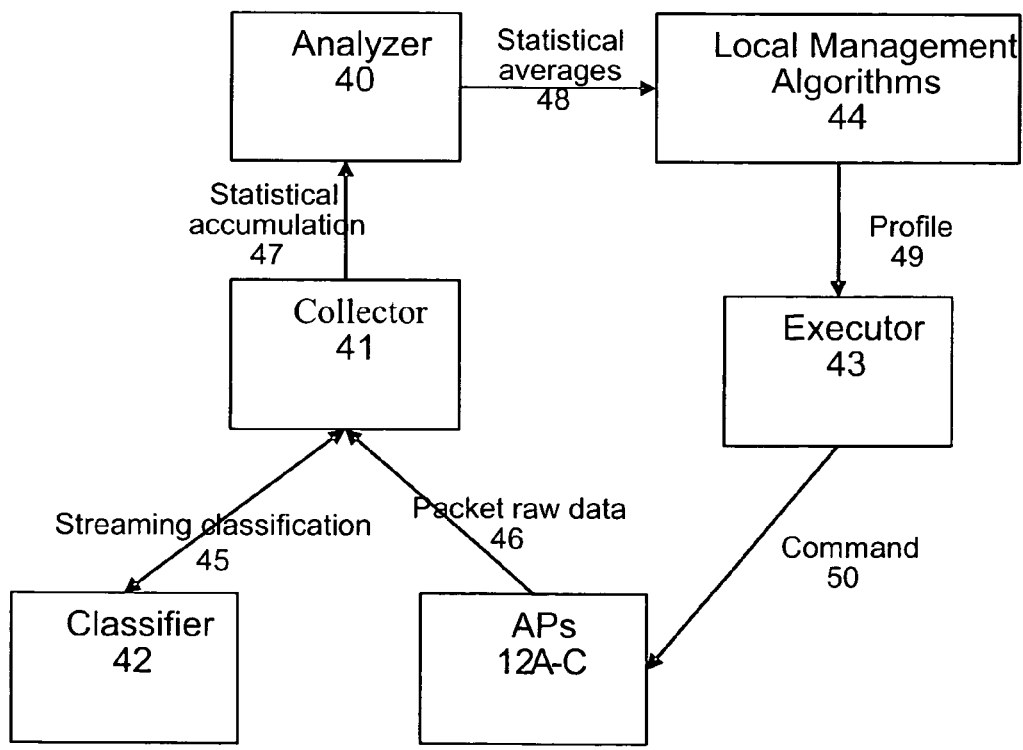
FIG. 18 is an illustration of a channel monitor in accordance with the present invention.

FIG. 18 illustrates an embodiment of the present invention for monitoring a channel. According to FIG. 18, monitoring a channel is performed as follows. It is to be understood that FIG. 1 is an exemplary implementation of the general concept of the present invention which features the following inputs: collecting statistics at all levels, per user and per channel; and the following outputs: a decision to disconnect or LB a user.

Collecting raw traffic data 46 from one or more of the channels, APs, Ethernet, and/or bridging 14 device [add bridge 14 to fig].

Referring to FIG. 1, raw traffic data 46 is collected by collector 41. Raw traffic data 46, collected by collector 41, is used by SM and LB algorithms. Raw traffic data 46 is collected on both the receiving and transmitting directions and on the different channels/APs.

Optionally, sorting raw traffic data 46 by stations.

In an embodiment of the present invention, collector 41 sorts raw traffic data 46 by stations.

Optionally, extracting statistical traffic data 47 from collected raw traffic data 46 and control packets, which are sent to and received from the various stations.

Optionally, statistical traffic data 47 is extracted from collected raw traffic data 46 and from control packets sent to and received from the various stations. Exemplary statistical traffic data 47 accumulated by collector 41 includes at least one of the following:

(a) Packet statistics, including packet size, packet bit rate, retransmission counters, frame retransmission failure, etc.

(b) Recognition of VoIP or Video, or general streaming activity performed by a station.

Application type. For example, TCP/UDP (c) Packet classification performed by a designated classifier. Referring to FIG. 1, the classification is implemented by classifier 42.

(d) Reception level and quality of the link between MAP 11 and a station.

User profile, such as SLA.

Throughput per station.

Optionally, statistics are collected from the APs and stations using IEEE 802.11k Estimating the channel properties according to channel measurements.

This channel calculation may be calculated in addition to, or instead of, the previous user-based calculations. The channel properties are a function of the measured WLAN activities (i.e. any WLAN activity that is received in that channel) and other non-WLAN interferences received.

Extracting statistical information 48 from the collected raw traffic data 46.

In an embodiment of the present invention, the channel is analyzed by analyzer 40. Analyzer 40 extracts averages and high-level statistics 48 from collected raw traffic data 46.

Local management algorithm 44 making decisions based on extracted statistical information 48.

In an embodiment of the present invention, local management algorithm 44 receives the collected and/or analyzed data; and based on the information it contains, decides what to do in the following exemplary cases:

Should the network be optimized?

Which stations should be handovered between channels, between APs, and between MAPs?

Should a station be accepted or disconnected?

How should stations be handovered?

Should the RF characteristics of the system be changed?

In an embodiment of the present invention, averages and higher-level statistics 48 are forwarded to global management algorithms as well.

Executing the decisions taken by local management algorithm 44.

In an embodiment of the present invention, the decisions made by local management algorithm 44 are executed by executor 43. Executor 43 is responsible for executing the policy decided by the SM and LB algorithms. Executor 43 sends at least one command 50 to appropriate APs 12A-C.

In an exemplary IEEE 802.11 type of protocol embodiment, executor 43 is the component that receives from the algorithms the command to disconnect/roam a user, and executes the command. Moreover, based on the policy provided by the algorithms, executor 43 may decide whether to answer a probe of a station and/or to accept association of a specific station.

Referring now to the problematic station detection algorithm,

This algorithm searches for specific users that significantly degrade the whole system performance. Moving those users thus increases the total throughput of the system. A novel aspect of the present invention is that the most interfering stations (i.e. stations that cause performance degradation in relation to other users) are moved or disconnected from the current channel. The decision is mainly made according to the time that is wasted by a specific station compared to other stations and according to additional statistics. This is in contrast to prior art methods that simply separate users according to their rate.

In an IEEE 802.11 type of protocol, problematic stations may severely degrade the network's performance. In order to prevent the performance degradation, the problematic station detection algorithm of the present invention is executed. Optionally, the problematic station detection algorithm is based on calculating the amount of time a station is wasting, but it is to be understood that calculating the amount of time a station is wasting is only an exemplary embodiment of the general method of the present invention. Examples of additional/alternative parameters that the problematic station detection algorithm may be based on are:

The amount of network resource waste caused by the specific station, i.e. how much system resources are wasted because of a specific station. For example, a hidden station causes many collisions, and therefore wastes a large amount of network resources.

Another example is a station having a limited RSSI, which therefore needs many retransmissions at a low rate.

Calculating the amount of time that is wasted by a specific station.

The term "station-wasted time" is defined herein as the time used by a station for transmitting without receiving an acknowledge signal (ACK). Similarly, the term "network-wasted time" is the sum total of all stations' wasted time.

In an embodiment of the present invention, the wasted time is calculated by summing the time of all retransmissions for which the station did not received an ACK. Preferably, the time for each retransmission for which the station did not received an ACK is equal to the packet's transmission time plus the time wasted on waiting for receiving the ACK. The waiting time starts immediately after the end of the transmission. This waiting time is known as "ACK time out" in IEEE 802.11 type of protocol. Optionally, calculating the wasted time on the downlink channel is different from calculating the wasted time on the uplink channel.

Referring to calculating the wasted time on the downlink channel, the exact number of retransmissions and each retransmission's rate are known. Therefore, the wasted time calculation is a straightforward process.

Referring to calculating the wasted time on the uplink channel, the exact number of retransmissions and each retransmission's rate are not known, and more specifically, in the uplink channel what is only known is whether or not there was a retransmission. Therefore, the wasted time calculation is based on estimating the relevant paraments.

Another optional input to the algorithm is the amount and type of transmitted data. For example, if a station transmits more data compared to other stations, than its wasted time is probably longer, but its relative percentage of wasted time is lower. The algorithm should takes into account this difference when deciding which station to disconnect or LB.

Alternatively, a proprietary protocol is used for obtaining a better estimation of the time being wasted by a station. Exemplary additional information used by the proprietary protocol are: (a) the number of retransmissions, (b) hidden station indication, (c) transmissions rates.

An example of a proprietary protocol that supplies additional information about the measurements is the IEEE 802.11k.

Comparing the amount of time wasted by a specific station with the amount of network time wasted by all stations, on average.

The average amount of network time wasted by all stations is calculated by summing up the wasted transmissions times of all the relevant stations and dividing the result by the total number of relevant stations.

Identifying a specific station as a problematic station if the amount of time that the station wastes is more than the average amount of time wasted in the network, plus a factor.

In an embodiment of the present invention, a low-pass filter is operated on the measurements in order to filter out the random noises and non-representative problems.

The factor that is added to the amount of time wasted in the network may be predefined or set dynamically.

Optionally, the algorithm takes into account the amount and type of transmitted data. For example, if a station transmits more data compared to other stations, than its wasted time is probably longer, but its relative percentage of wasted time is lower. The algorithm should takes into account this difference when deciding which station to disconnect or LB.

Optionally, moving a problematic station to another channel/AP or disassociation.

The novel problematic-station-detection algorithm of the present invention may significantly increase the total throughput of a network. In specific scenarios, the throughput may be multiplied by 10 due to the above-disclosed problematic-station-detection algorithm.

The discussed algorithm of the present invention may be further improved by applying the following, optional steps.

Optionally, assigning a minimum received threshold to respond to in each specific channel.

When an AP receives from a station signals which are below a minimum received threshold, the AP may not respond. This is done by assigning a minimum answering-threshold to the transmissions received on each specific channel.

This method prevents a situation wherein a station connects to the network, interferes with the network, is identified by the algorithm, but until it is moved—degrades the network performance. This method does not allow a problematic user to connect to the network and therefore prevents the performance degradation ahead of time.

The steps for identifying problematic users in this case are:
Measure the RSSI of all stations
Measure the performance/throughput of the whole channel
Estimate the minimum RSSI level of a new user below which it is estimated that the new station might degrade the total performance. Optionally, the estimation assumes that there is another channel that can accept all users.
Receive a user's probe request and/or association request, and respond positively only if the measured RSSI of the user is above the minimum threshold.

Optionally, assigning specific stations having high QoS requirements, to a specific channel.

In an embodiment of the present invention, at least one channel is reserved for stations that are specifically sensitive to QoS issues, such as VoIP and Video over IP applications. The communication network of the present invention ensures that those reserved channels feature the required QoS by assigning a specific channel for sensitive applications. Whenever the specific channel for sensitive applications gets close to reaching its saturation point, additional stations are directed to other channels, or even to other APs.

Optionally, problematic-station-detection algorithms are run in Global Management 17 when the stations are moved between APs controlled by different problematic-station-detection algorithms. In this case, problematic-station-detection algorithms can be referred to as SM algorithms.

[Using Problematic-Station-Detection Algorithm to LB and SM]

Referring now back to the LB algorithm of the present invention, when two stations transmit at the same time there is a collision. Another possible scenario for a collision occurs when a first station is transmitting, and a second station that does not receive the transmissions of the first station, transmits to the same AP. In this case, a collision occurs and the AP may receive only one transmission, or none. In order to solve this problem, a station which does not receive the transmissions of another station can be notified by the AP to expect a transmission, and not to transmit. An alternative solution is to make sure that closely located stations are transmitting on the same channel, and therefore receiving the transmissions of one another, and are not transmitting when transmissions from another station are received by them. Problematic-station-detection algorithms are run in the APs when the stations are moved between different channels, i.e. between different APs controlled by the same problematic-station-detection algorithm. In this case, the problematic-station-detection algorithms can be referred to as LB algorithms.

Additional criteria and methods for moving stations between APs and between channels on the same AP.

In an embodiment option of the present invention, Access Control 22 builds a map that includes the following information:

All APs
All stations
Which AP is receiving which station
At what power each station is received by the appropriate AP.

According to the map, a decision regarding whether to force a station to pass to a different MAP and/or to a different channel, i.e. different AP, is reached.

A significant and particular aspect of the novelty and inventiveness of the present invention, relating to the map built in Access Control 22, is that it enables the MAP to move stations between channels and between MAPs. Moving stations between channels and between MAPs may herein sometimes be referred to as "soft force roaming" and sometimes as "hard force roaming". Moving the station may be between one AP and another AP or a specific channel in the other AP, depending on each channel's load.

In prior art IEEE 802.11 systems types, the station decides whether to transfer to a different AP or channel. Using the map helps the MAP operate the soft force roaming and hard force roaming.

In an embodiment of the present invention, in order to move stations between channels and between MAPs, the system limits both the minimum level of reception sensitivity, as well as the minimum level of reception sensitivity to which it is replying to probe transmissions from a station. On the fastest channel, responses are made only to a station that meets specific criteria. For example, the system does not respond to IEEE 802.11b station types on channels which are allocated to IEEE 802.11g station types. Moreover, the system ensures that each station type (IEEE 802.11b and IEEE 802.11g) is connected to its appropriate channel.

It is to be understood that a problematic station detection algorithm may detect multiple problematic stations in serial or parallel.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

It is to be understood that the present invention is not limited in its application to the details of the order or sequence of steps of operation or implementation, nor to the details of construction, arrangement, and composition of the corresponding thereof, set in the description, drawings, or examples of the present invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and broad scope of the appended claims and their equivalents.

What is claimed is:

1. A method for managing wireless communication network, comprising:
   detecting a first wireless client whose wireless connection to the network induces station-wasted time by one or more wireless client connections to the network, and reallocating wireless bandwidth to either the first wireless client or to other wireless clients bases on the station-wasted time,
   wherein the station-wasted time is calculated by summing time of all retransmissions for which the first wireless client did not received an ACK signal, and
   wherein the time for each retransmission for which the first wireless client did not received an ACK signal is equal to a packet's transmission time plus time wasted on waiting for receiving the ACK signal acknowledging a reception of the packet.

2. The method according to claim 1, wherein detecting is performed substantially in real time and comprises gathering raw traffic data from at least one wireless channel.

3. The method according to claim 2, wherein detecting further comprises estimating a property of the at least one channel.

4. The method according to claim 2, wherein detecting further comprises extracting statistical information from the collected raw traffic data.

5. The method according to claim 4, wherein detecting further comprises comparing statistics of a wireless channel usage by the first wireless client statistics against a statistical average of channel usage by other clients.

6. The method according to claim 1, wherein reallocating wireless bandwidth comprises changing beam directions.

7. The method according to claim 1, wherein reallocating wireless bandwidth comprises changing wireless channels of one or more wireless clients.

8. The method according to claim 7, wherein reallocating wireless bandwidth further comprises moving one or more wireless clients to a different access point.

9. The method according to claim 1, wherein reallocating wireless bandwidth comprises moving one or more wireless clients to a different access point.

10. A wireless communication wireless network appliance, comprising:
   network management device is configured to detect a first wireless client whose wireless connection induces station-wasted time by one or more wireless clients connections to the network, and to reallocate wireless bandwidth to either the first wireless client or to other wireless clients bases on the station-wasted time,
   wherein the station-wasted time is calculated by summing time of all retransmissions for which the first wireless client did not received an ACK signal, and
   wherein the time for each retransmission for which the first wireless client did not received an ACK signal is equal to a packet's transmission time plus time wasted on waiting for receiving the ACK signal acknowledging a reception of the packet.

11. The appliance according to claim 10, wherein detecting is performed substantially in real time and comprises gathering raw traffic data relating to at least one wireless channel.

12. The appliance according to claim 11, wherein detecting further comprises estimating a property of the at least one channel.

13. The appliance according to claim 10, wherein detecting further comprises extracting statistical information from the collected raw traffic data.

14. The appliance according to claim 13, wherein detecting further comprises comparing statistics of a wireless channel usage by the first wireless client statistics against a statistical average of channel usage by other clients.

15. The appliance according to claim 10, wherein reallocating wireless bandwidth comprises causing a wireless access point to change beam directions.

16. The appliance according to claim 10, wherein reallocating wireless bandwidth comprises causing a wireless access point to change wireless channels of one or more wireless clients.

17. The appliance according to claim 16, wherein reallocating wireless bandwidth further comprises causing one or more wireless clients to move to a different access point.

18. The appliance according to claim 10, wherein reallocating wireless bandwidth comprises moving one or more wireless clients to a different access point.

* * * * *